(12) United States Patent
Ogaki et al.

(10) Patent No.: US 9,088,490 B2
(45) Date of Patent: Jul. 21, 2015

(54) NETWORK SWITCHING DEVICE, NETWORK SWITCHING SYSTEM, AND METHOD OF CHANGING POWER STATE OF NETWORK SWITCHING DEVICE

(71) Applicant: ALAXALA Networks Corporation, Kanagawa (JP)

(72) Inventors: Hiroto Ogaki, Tokyo (JP); Hideo Kodaka, Ebina (JP)

(73) Assignee: Alaxala Networks Corporation, Kanagawa (JP)

( * ) Notice: Subject to any disclaimer, the term of this patent is extended or adjusted under 35 U.S.C. 154(b) by 137 days.

(21) Appl. No.: 13/872,383

(22) Filed: Apr. 29, 2013

(65) Prior Publication Data
US 2014/0036660 A1    Feb. 6, 2014

(30) Foreign Application Priority Data

Aug. 1, 2012    (JP) .................................. 2012-171311

(51) Int. Cl.
*H04L 1/00* (2006.01)
*H04L 12/24* (2006.01)
*H04L 12/12* (2006.01)

(52) U.S. Cl.
CPC ............ *H04L 41/0833* (2013.01); *H04L 12/12* (2013.01); *H04L 41/0663* (2013.01); *Y02B 60/34* (2013.01)

(58) Field of Classification Search
USPC ......... 370/351, 389, 396, 395.2–395.21, 400, 370/419, 428
See application file for complete search history.

(56) References Cited

U.S. PATENT DOCUMENTS

| 7,953,220 B2 * | 5/2011 | Shinohara et al. ............. 379/413 |
| 2007/0201426 A1 | 8/2007 | Shinohara et al. |
| 2009/0077407 A1 * | 3/2009 | Akimoto ....................... 713/340 |
| 2010/0182926 A1 * | 7/2010 | Kubota .......................... 370/252 |

FOREIGN PATENT DOCUMENTS

| JP | 2007-228490 A | 9/2007 |
| JP | 2010-092329 A | 4/2010 |

* cited by examiner

*Primary Examiner* — Frank Duong
(74) *Attorney, Agent, or Firm* — Mattingly & Malur, PC

(57) ABSTRACT

A first network switching device communicates to and from a second network switching device different in at least one of a device configuration and a device performance. The network switching device has at least one of plurality of network interface units and packet forwarding unit which is a power state control subject. A power state control unit of the first network switching device transmits, in order to change the power state of the second network switching device, a forwarding performance notification including the forwarding performance of a power state control subject after the change to the second network switching device.

13 Claims, 11 Drawing Sheets

| POWER STATE | FORWARDING PERFORMANCE |
| --- | --- |
| high | 100 Gbps |
| highMinus | 75 Gbps |
| low | 50 Gbps |
| lowMinus | 25 Gbps |
| softoff | 0 Gbps |

*Fig. 7*

| VERSION | TYPE | VIRTUAL ROUTER IDENTIFIER | PRIORITY | COUNT IP ADDRESS |
| --- | --- | --- | --- | --- |
| AUTHENTICATION TYPE | ADVERTISEMENT INTERVAL | | CHECKSUM | |
| PACKET FORWARDING UNIT FORWARDING PERFORMANCE | | | | |
| PACKET FORWARDING UNIT DISTRIBUTION INDEX | | | | |
| NETWORK INTERFACE UNIT FORWARDING PERFORMANCE | | | | |
| NETWORK INTERFACE UNIT DISTRIBUTION INDEX | | | | |

*Fig. 8*

NETWORK SWITCHING DEVICE, NETWORK SWITCHING SYSTEM, AND METHOD OF CHANGING POWER STATE OF NETWORK SWITCHING DEVICE

CLAIM OF PRIORITY

The present application claims priority from Japanese patent application JP 2012-171311 filed on Aug. 1, 2012, the content of which is hereby incorporated by reference into this application.

BACKGROUND OF THE INVENTION

This invention relates to a network switching device for configuring a network to be redundant.

While a traffic amount on the Internet is rapidly increasing as network services such as video streaming have been enhanced, the installed number of network switching devices is greatly increasing. Along with such increase, a power consumption of the network switching devices in Japan in 2025 is estimated to increase to 13 times of that in 2006. The power consumption amount corresponds to ten percent of the total power generation amount in Japan, and a reduction in the power consumption of the network switching devices is an important object.

As a power saving technology for the network switching device, there is a technology disclosed in Japanese Patent Application Laid-open No. 2007-228490 (Patent Literature 1). In Patent Literature 1, there is a description: "the above-mentioned network switching device 1000 according to this embodiment changes, depending on the setting made by the user, the operating frequency of the clock signal provided for the respective components. With this configuration, if the operating frequency increases, the processing speed of semiconductor integrated circuits (such as the packet processing circuit 120 and the forwarding destination determination circuit 130) can increase, thereby increasing the performance of the network switching device 1000, and if the operating frequency decreases, the processing speed of the semiconductor integrated circuits can decrease, thereby decreasing the power consumption of the network switching device 1000. As a result, in the network switching device 1000, the power consumption amount can be restrained while a required performance is maintained when required".

Moreover, as an index of a relationship between a forwarding performance and a power consumption of a network interface unit for transmitting/receiving a packet and a packet forwarding unit for determining a forwarding destination of a received and transmitted packet, there is a power state. The power state is defined depending on the forwarding performance, and is thus unique to each of the packet forwarding unit and the network interface unit. The user can control the forwarding performances of the packet forwarding unit and the network interface unit by changing the power states, thereby controlling the power consumptions.

For example, by setting the power states of the packet forwarding unit and the network interface unit to "low", which is efficient in power saving, the forwarding performances are restrained, and hence the power consumptions are reduced.

As a power saving technology in a case where network switching devices are configured to be redundant, there is known a technology described in Japanese Patent Application Laid-open No. 2010-92329 (Patent Literature 2). In Patent Literature 2, there is a description: "A device 11 operating as a master and a device 12 operating as a slave are coupled to each other via two input/output signals 21 and 22 provided for power saving control. Each of the devices 11 and 12 includes a power saving control unit 100. The power saving control unit 100 uses one input/output signal out of the input/output signals to notify the device of the coupling destination of, as an operation state of the device, whether or not a requested task is present. Moreover, the power saving control unit 100 determines whether or not to control the device transition to a power saving state based on whether or not a task to be processed by the device is present, and whether or not a task which is notified of by the device of the coupling destination and is requested to be processed by the device is present" (refer to [Abstract]).

Patent Literature 1 does not disclose the power saving when the network switching devices are configured to be redundant. Moreover, the invention described in Patent Literature 2 can be applied only to a case where the numbers and forwarding performances of packet forwarding units and network interface units provided for each of a device (master network switching device) operating as a master and a device (backup network switching device) operating as a slave are the same.

SUMMARY OF THE INVENTION

Therefore, there arises such a problem that, in a network switching system including the network switching device operating as the master network switching device and the network switching device operating as the backup network switching device, if the numbers or forwarding performances of the packet forwarding units and network interface units included in the respective network switching devices are different from each other, an excess power of the backup network switching device cannot be reduced.

An object of this invention is to provide a network system for reducing, in a network switching system including a network switching device operating as a master network switching device and a network switching device operating as a backup network switching device, an excess power of the backup network switching device even if the numbers or forwarding performances of packet forwarding units and network interface units included in the respective network switching devices are different from each other.

According to an aspect of the present invention, there is provided a first network switching device communicable to and from a second network switching device of which at least one of a device configuration and a device performance is/are different from the first network switching device, comprising: a plurality of network interface units for transmitting and receiving a packet to and from a network; a packet forwarding unit for determining a forwarding destination of the packet received by any one of the plurality of network interface units, and forwarding the packet to any one of the plurality of network interface units; and a power state control unit for controlling a power state of at least one of the plurality of network interface units and the packet forwarding unit, wherein: the at least one of the plurality of network interface units and the packet forwarding unit is a power state control subject which is controllable to be brought into a plurality of power states different in power consumption, whose forwarding performance increases as the power consumption increases and decreases as the power consumption decreases; and the power state control unit transmits, in order to change the power state of the second network switching device, a forwarding performance notification including the forwarding performance of a power state control subject after the change to the second network switching device.

A brief description is now given of effects provided by the exemplary embodiment of this invention disclosed in this application. This invention enables to provide a network system for reducing, in a network switching system including a network switching device operating as a master network switching device and a network switching device operating as a backup network switching device, an excess power of the backup network switching device even if the numbers or forwarding performances of packet forwarding units and network interface units included in the respective network switching devices are different from each other.

BRIEF DESCRIPTION OF THE DRAWINGS

The present invention can be appreciated by the description which follows in conjunction with the following figures, wherein:

FIG. 7 is an explanatory diagram of a network interface unit forwarding performance management table according to the first embodiment of this invention;

FIG. 8 is an explanatory diagram of a format of a VRRP packet according to the first embodiment of this invention;

DETAILED DESCRIPTION OF THE PREFERRED EMBODIMENTS

Figure 1:
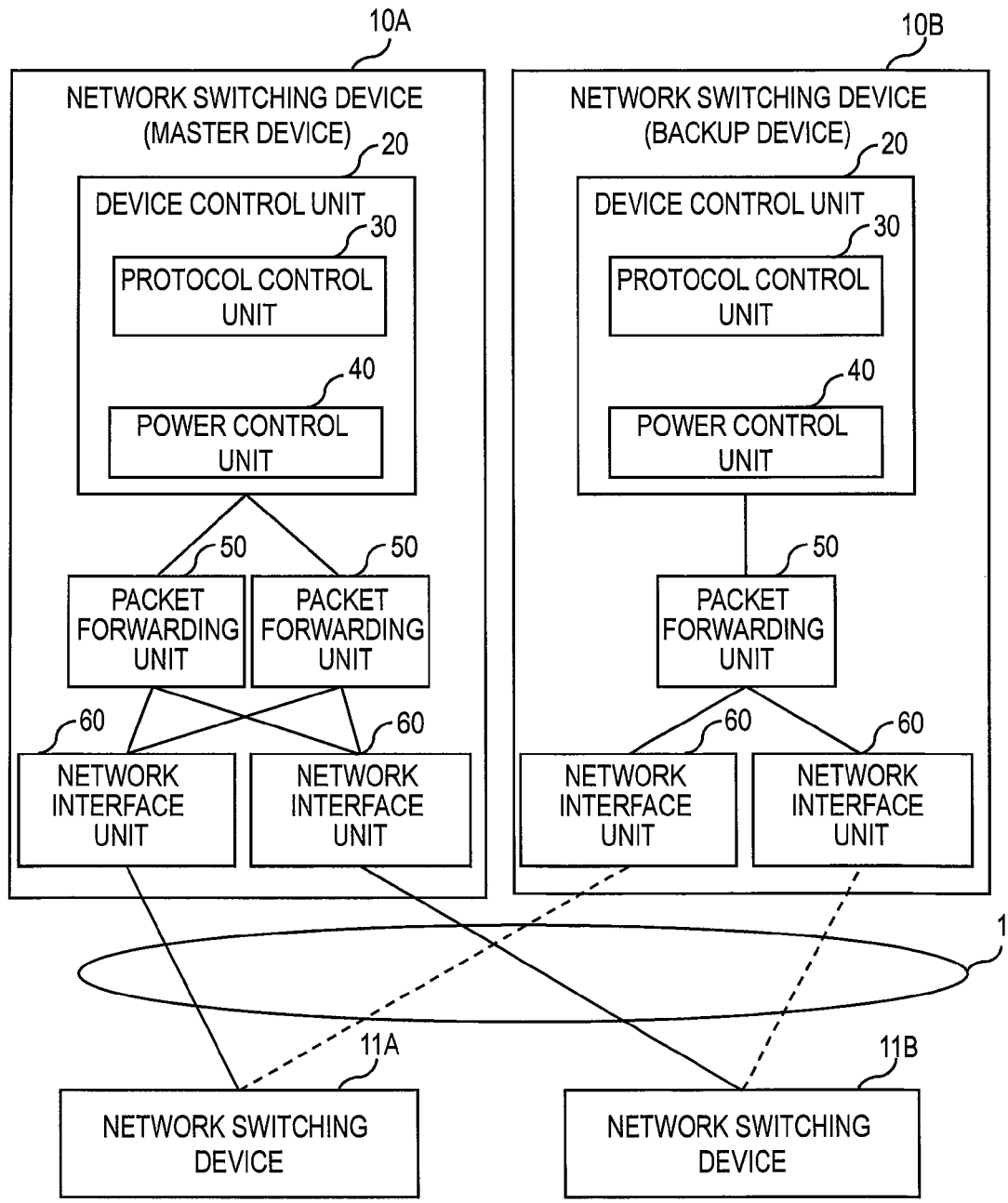
FIG. 1 is a configuration diagram of a network according to a first embodiment of this invention.

A description is now given of embodiments of this invention referring to the drawings. Substantially the same components are denoted by the same numerals, and a repetitive description thereof is therefore omitted.

(First Embodiment)

Referring to FIGS. 1 to 13, a description is now given of a first embodiment of this invention.

FIG. 1 is a configuration diagram of a network 1 according to the first embodiment of this invention.

The network 1 includes network switching devices (apparatus) 10A and 10B (hereinafter generally referred to as network switching devices 10) and network switching devices 11A and 11B. The network switching devices 10A and 10B couple the network 1 to upstream networks. Moreover, the network switching devices 10A and 10B are paired, and are coupled to each other via the network switching devices 11A and 11B. The network switching devices 11A and 11B are coupled to a PC and the like, and terminate the network 1.

In order to increase reliability of communication, the network switching devices 10A and 10B use the virtual router redundancy protocol (VRRP) or the gigabit switch redundancy protocol (GSRP) to configure a path of the network 1 to be redundant. It should be noted that the following description is given of this embodiment while it is assumed that the path of the network 1 is configured to be redundant by using the VRRP.

Specifically, the network switching device 10A operates as a master network switching device, and the network switching device 10B operates as a backup network switching device. The master network switching device is a network switching device for actually forwarding a packet. The backup network switching device is a device for not forwarding a packet in a normal condition, and forwarding a packet when an abnormality occurs in the master network switching device.

The network switching device 10 includes a device control unit 20, packet forwarding units 50, and network interface units 60. The network interface unit 60 transmits/receives a packet, and the packet forwarding unit 50 is coupled to the network interface unit 60 and determines a forwarding destination of the packet based on header information of a packet transmitted/received by the network interface unit 60. The device control unit 20 manages protocol information based on the packet transmitted/received by the network interface units 60, and controls a power state of at least one of the packet forwarding units 50 and the network interface units 60 based on the number of packets transmitted/received by the network interface unit 60.

A description is now given of the device control unit 20.

The device control unit 20 includes a processor and memory (not shown), and in the memory, programs for controlling the entire network switching device 10 and the like are stored. It should be noted that the processor executes the programs stored in the memory.

Moreover, the device control unit 20 includes a protocol control unit 30 and a power control unit 40. The protocol control unit 30 manages a redundancy protocol such as the VRRP or GSRP, and the power control unit 40 controls the power state of at least one of the packet forwarding units 50 and the network interface units 60.

Specifically, the protocol control unit 30 analyzes a configuration set by a user, thereby managing a redundancy relationship between the network switching devices 10A and 10B. The power control unit 40 determines power states based on the respective forwarding performances of the packet forwarding units 50 and the network interface units 60, and controls the power states of the packet forwarding units 50 and the network interface units 60 so as to attain the determined power states.

It should be noted that the protocol control unit 30 and the power control unit 40 are realized by the processor (not shown) of the device control unit 20 executing corresponding programs.

The packet forwarding unit 50 is connected to the network interface unit 60, and determines, based on header information of a packet transmitted/received by the network interface unit 60, the forwarding destination of the packet.

The network interface unit 60 is connected, via a port (not shown), to a line (such as a twisted-pair cable and an optical fiber) such as the Ethernet (trademark), and controls the transmission/reception of packets.

It should be noted that the device control unit 20, the packet forwarding units 50, and the network interface units 60 are connected via a bus (not shown).

Moreover, in FIG. 1, the network switching device 10A includes the two packet forwarding units 50 and the two network interface units 60, and the network switching device 10B includes the one packet forwarding unit 50 and the two network interface units 60, but the numbers of packet forwarding units 50 and the numbers of network interface units 60 included in the network switching devices 10 are not limited to this example.

Further, the network switching device 10A operates as a master network switching device and the network switching device 10B operates as the backup network switching device, and hence on the paths between the network switching devices 11A and 11B and the network switching device 10A, packets are actually transmitted/received, and on paths between the network switching devices 11A and 11B and the network switching device 10B, packets are not transmitted/received.

Figure 2:
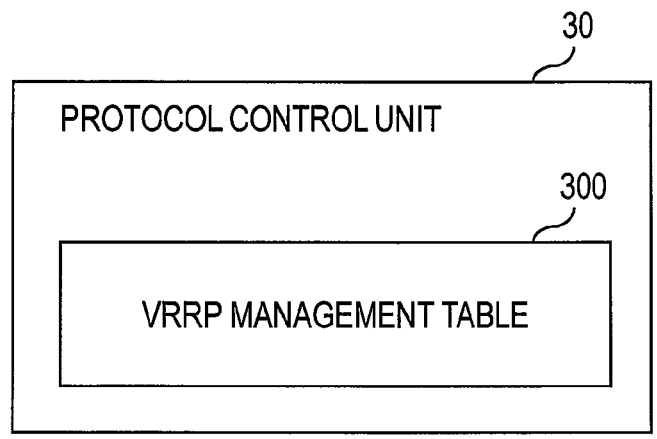
FIG. 2 is an explanatory diagram of a configuration of the protocol control unit according to the first embodiment of this invention.

FIG. 2 is an explanatory diagram of a configuration of the protocol control unit 30 according to the first embodiment of this invention.

The protocol control unit 30 includes a VRRP management table 300 centrally managing information on the configuration and VRRP set by the user. The VRRP management table 300 is described in detail referring to FIG. 5. The protocol control unit 30 refers to the VRRP management table 300, and carries out master-backup determination processing of determining whether the network switching device 10 is to be operated as a master network switching device or a backup network switching device. The master-backup determination processing is described in detail referring to FIGS. 9 and 10.

Figure 3:
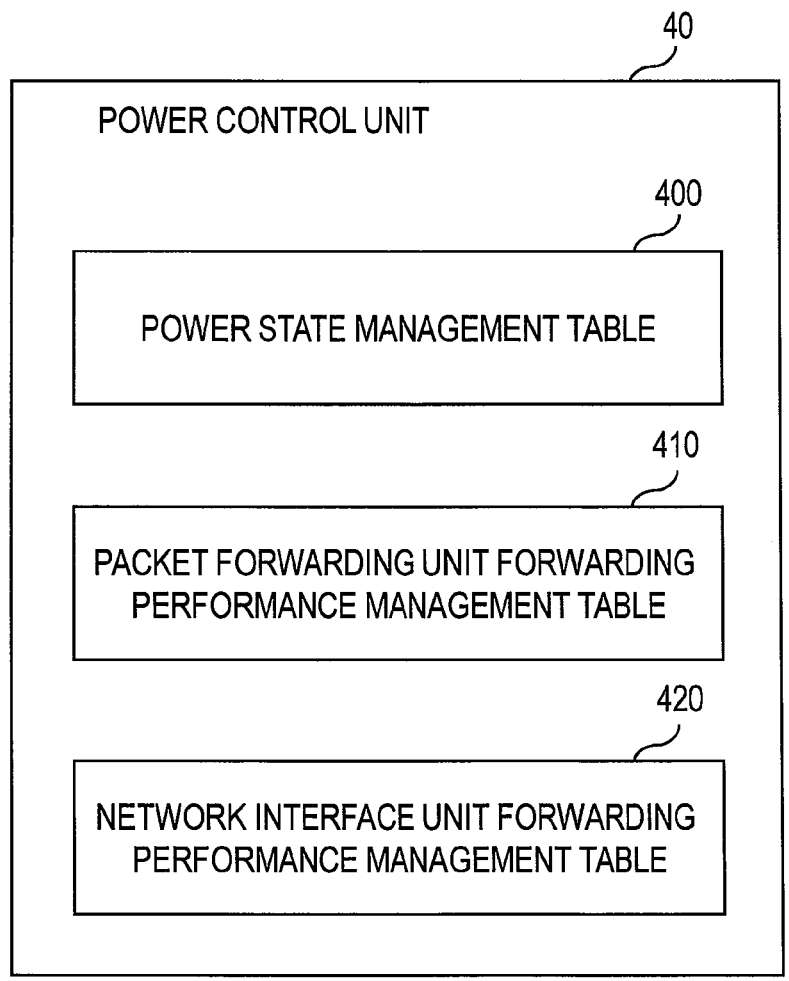
FIG. 3 is an explanatory diagram of a configuration of the power control unit according to the first embodiment of this invention.

FIG. 3 is an explanatory diagram of a configuration of the power control unit 40 according to the first embodiment of this invention.

The power control unit 40 includes a power state management table 400, a packet forwarding unit forwarding performance management table 410, and a network interface unit forwarding performance management table 420.

To the power state management table 400, current power states of the packet forwarding units 50 and the network interface units 60 included in the network switching device 10 and the maximum forwarding performances at the current power states are registered. The power state management table 400 is described in detail referring to FIG. 5.

To the packet forwarding unit forwarding performance management table 410, relationships between a power state which can be set to the packet forwarding unit 50 included in the network switching device 10, and a forwarding performance of the packet forwarding unit 50 in the power state are registered. The packet forwarding unit forwarding performance management table 410 is described in detail referring to FIG. 6.

To the network interface unit forwarding performance management table 420, relationships between a power state which can be set to the network interface unit 60 included in the network switching device 10, and a forwarding performance of the network interface unit 60 in the power state are registered. The network interface unit forwarding performance management table 420 is described in detail referring to FIG. 7.

Before the descriptions of the respective tables 300 to 420, a description is given of the VRRP.

In the VRRP, on the network switching device 10, a virtual router (virtual network switching device) is set to each of IP interfaces with which an IP address is assigned. A virtual router identifier (virtual router ID) is assigned to the virtual router. A pair of virtual routers of the network switching device 10A and the network switching device 10B to which the same virtual router ID is assigned constitute a master virtual router for actually carrying out network switching for a packet and a backup virtual router for not carrying out the network switching for a packet in a normal condition and carrying out the network switching for a packet in an abnormal condition.

Whether a virtual router operates as a master virtual router or a backup virtual router is determined by a priority set by the user. The network switching devices 10 for configuring the network 1 to be redundant transmit a VRRP packet to each other at each predetermined time interval. The VRRP packet includes a virtual router ID set to the virtual router itself, and the priority of the virtual router. As a result, out of the pair of the virtual routers having the same virtual router ID, a virtual router to which a higher priority is set is determined to operate as the master virtual router, and a virtual router to which a lower priority is set is determined to operate as the backup virtual router.

If the VRRP packet is not received for the predetermined time interval, the backup virtual router detects occurrence of an abnormality on the master virtual router, subsequently operates as the master virtual router, and forwards a packet. As a result, even if the master virtual router goes down, the forwarding of data can be continued.

Moreover, by providing both the master virtual router and the backup virtual router in the one network switching device 10, load of the data forwarding can be distributed to the two network switching devices 10. On the other hand, by providing the master virtual router and the backup virtual router on the separate network switching devices 10, the reliability against a failure of the network switching device 10 can increase. In this case, the network switching device 10 which actually transmits/receives a packet is referred to as master network switching device and an auxiliary network switching device 10 which operates when a failure occurs is referred to as backup network switching device.

Figure 4:
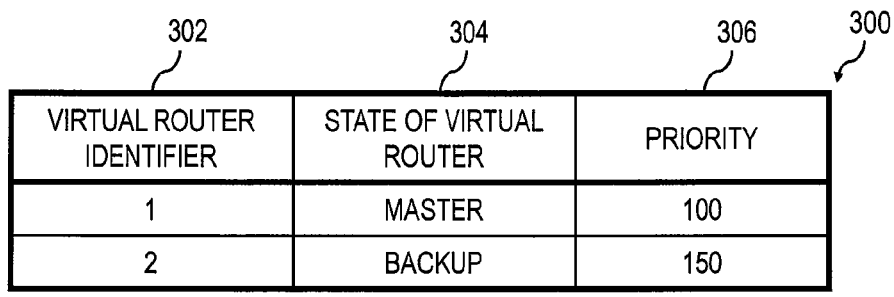
FIG. 4 is an explanatory diagram of a VRRP management table according to the first embodiment of this invention.

FIG. 4 is an explanatory diagram of the VRRP management table 300 according to the first embodiment of this invention.

The VRRP management table 300 includes virtual router identifiers 302, states of virtual router 304, and priorities 306.

To the virtual router identifier 302, a virtual router identifier assigned to a virtual router set on the network switching device 10 is registered. To the state of virtual router 304, information indicating whether the virtual router is operating as a master virtual router or a backup virtual router is registered. To the priority 306, a value ranging from 0 to 255 representing a priority set to the virtual router is registered. As the value registered to the priority 306 becomes higher, the priority becomes higher.

As described above, each of the network switching device 10 for configuring the network 1 to be redundant transmits/receives the VRRP packet including the virtual router ID and the priority at each predetermined time interval, and can thus recognize the virtual router ID and the priority of the other network switching device 10. As a result, to the VRRP management table 300 of each of the network switching devices 10, information on the virtual routers set on the network switching devices 10 for configuring the paths of the network 1 to be redundant is also registered. In other words, to the VRRP management table 300 of the network switching device 10A, the information on the virtual routers set on the network switching device 10B is registered in addition to the information on the virtual routers set on the network switching device 10A. It should be noted that, referring to FIG. 8, a detailed description is given of a format of the VRRP packet.

The protocol control unit 30 refers to the VRRP management table 300, and compares values registered to the priorities 306 of the virtual routers having the same virtual router identifier registered to the virtual router identifiers 302 with each other, thereby determining whether each of the virtual routers is to operate as the master router or the backup router. Specifically, out of the virtual routers same in virtual router identifier, the protocol control unit 30 determines a virtual router larger in value registered to the priority 306 as one operating as a maser virtual router, and a virtual router smaller in value registered to the priority 306 as one operating as a backup virtual router.

Figure 5:
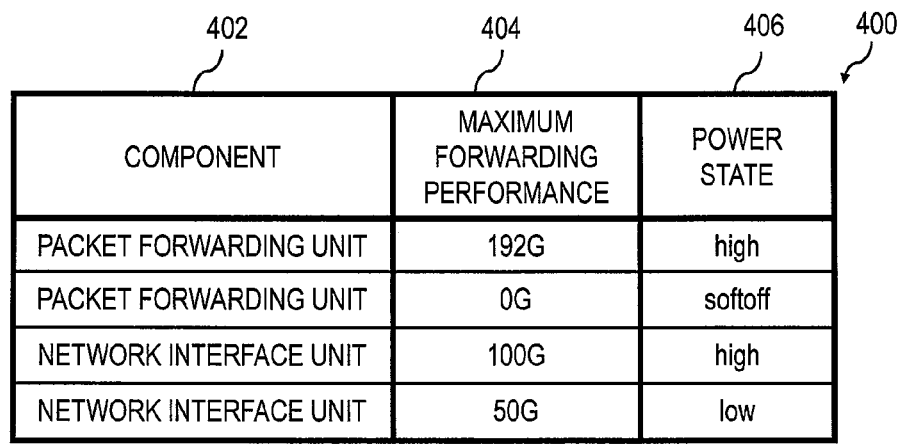
FIG. 5 is an explanatory diagram of a power state management table according to the first embodiment of this invention.
Figure 6:
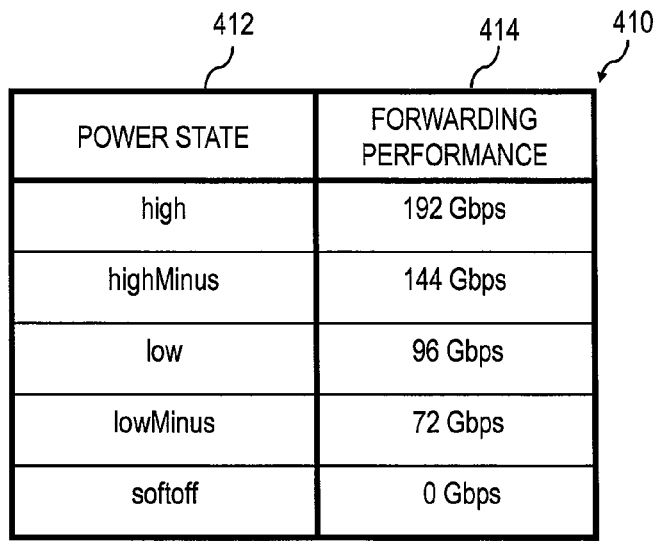
FIG. 6 is an explanatory diagram of a packet forwarding unit forwarding performance management table according to the first embodiment of this invention.

Then, referring to FIGS. 5 to 7, a detailed description is given of the various tables 400 to 420 included in the power control unit 40.

FIG. 5 is an explanatory diagram of the power state management table 400 according to the first embodiment of this invention.

The power state management table 400 includes components 402, maximum forwarding performances 404, and power states 406.

To the component 402, an identifier of a component (the packet forwarding unit 50 and the network interface unit 60) which is included in the network switching device 10 and the power state of which can be controlled is registered. To the maximum forwarding performance 404, the maximum forwarding performance at a power state registered to the power state 406 of the component identified by the identifier registered to the component 402 is registered. To the power state 406, a current power state of the component identified by the identifier registered to the component 402 is registered.

FIG. 6 is an explanatory diagram of the packet forwarding unit forwarding performance management table 410 according to the first embodiment of this invention.

The packet forwarding unit forwarding performance management table 410 includes power states 412 and forwarding performances 414.

To the power state 412, each of power states which can be set on the packet forwarding unit 50 is registered. To the forwarding performance 414, the forwarding performance at each of the power states of the packet forwarding unit 50 is registered.

According to this embodiment, five power states: "high", "highMinus", "low" "lowMinus", and "softoff" can be set to the packet forwarding unit 50. For example, "high" is a power state where the power saving function is not enabled, and the power consumption and the forwarding performances are maximum. "highMinus" is a power state highest in the power consumption and the forwarding performance next to "high". Similarly, in order of "low", "lowMinus", and "softoff", the power consumption and the forwarding performance decrease. It should be noted that "softoff" is a power state where the power consumption of the packet forwarding unit 50 is "0", and the forwarding performance thereof is also "0."

In this way, as the power consumption increases, the forwarding performance increases, and as the power consumption decreases, the forwarding performance decreases.

FIG. 7 is an explanatory diagram of the network interface unit forwarding performance management table 420 according to the first embodiment of this invention.

The network interface unit forwarding performance management table 420 includes power states 422 and forwarding performances 424.

To the power state 422, each of power states which can be set on the network interface unit 60 is registered. To the forwarding performance 424, the network interface performance at each of the power states of the network interface unit 60 is registered.

It should be noted that power states which can be set to the network interface unit 60 are the same as the power states which can be set to the packet forwarding unit 50, and a description thereof is therefore omitted.

FIG. 8 is an explanatory diagram of the format of the VRRP packet according to the first embodiment of this invention.

The VRRP packet includes a version 902, a type 904, a virtual router identifier 906, a priority 908, a count IP address 910, an authentication type 912, an advertisement interval 914, a checksum 916, a packet forwarding unit forwarding performance 918, a packet forwarding unit distribution index 920, a network interface unit forwarding performance 922, and a network interface unit distribution index 924.

In the version 902, the version of the VRRP is stored. In the type 904, a value, "1" or "2" is stored. A VRRP packet having "1" stored in the type 904 represents an advertisement packet transmitted at each predetermined time interval for notifying of a priority of a virtual router.

Moreover, a VRRP packet having "2" stored in the type 904 represents a sync_power_state packet transmitted when the power state of at least one of the packet forwarding units 50 and the network interface units 60 of the master network switching device is changed, for notifying the backup network switching device of the forwarding performance of the master network switching device.

In the virtual router identifier 906, a virtual router identifier assigned to a virtual router set on the network switching device 10 is stored. The network switching device 10 recognizes, based on the virtual router identifier stored in the virtual router identifier 906, a correspondence between a virtual router set on the other network switching device 10 and a virtual router set on itself. In the priority 908, a value ranging from 0 to 255 representing the priority set to the virtual router is stored.

In the count IP address 910, if "1" is stored in the type 904, the number of IP addresses for advertisement by the VRRP packet is stored. On the other hand, if "2" is stored in the type 904, in the count IP address 910, "4" is stored, which is a sum value of a packet forwarding unit assignment index representing an assignment type of a total forwarding performance of the packet forwarding units 50 and a total forwarding performance of the network interface units 60 in the network switching device 10A operating as the master network switching device, and a total forwarding performance of the packet forwarding units 50 in the network switching device 10B operating as the backup network switching device, and a network interface unit assignment index representing an assignment type for a total forwarding performance of the network interface units 60 in the network switching device 10B operating as the backup network switching device.

In the authentication type 912, an identifier for authenticating the VRRP packet is stored. In the advertisement interval 914, a value ranging from 0 to 255 for specifying a transmission interval of the VRRP packet is stored. In the checksum 916, a checksum for detecting a data error of the VRRP packet is stored.

A description is now given of the packet forwarding unit forwarding performance 918 to the network interface unit distribution index 924.

In these areas of a VRRP packet having "1" stored in the type 904, IP addresses for the advertisement by the VRRP packet are stored.

In these areas of a VRRP packet having "2" stored in the type 904, the packet forwarding unit forwarding performance 918 to the network interface unit distribution index 924 are stored.

In the packet forwarding unit forwarding performance 918, the sum value of the forwarding performances of the packet forwarding units 50 included in the master network switching device 10A is stored. In the packet forwarding unit distribution index 920, a value representing a type of assigning the sum value of the forwarding performances of the packet forwarding units 50 included in the master network switching device 10A to the packet forwarding units 50 included in the backup network switching device 10B is stored.

In the network interface unit forwarding performance 922, a sum value of the forwarding performances of the network interface units 60 included in the master network switching device 10A is stored. In the network interface unit distribution index 924, a value representing a type of assigning the sum value of the forwarding performances of the network interface units 60 included in the master network switching device 10A to the network interface units 60 included in the backup network switching device 10B is stored.

As the assignment methods for the forwarding performance of the packet forwarding units 50 and the network interface units 60 in the backup network switching device 10B, there are a first type and a second type.

The first type is a load balancing type in which, for example, the sum value of the forwarding performances of the packet forwarding units 50 is evenly assigned to the packet forwarding units 50 included in the backup network switching device 10B. The second type is an aggregate type in which, for example, the sum value of the forwarding performances of the packet forwarding units 50 is unevenly assigned to specific packet forwarding units 50 included in the backup network switching device 10B so that the power saving effect in the backup network switching device 10B is maximized. It should be noted that a first type and a second type for the network interface units 60 are the same as the first type and the second type for the packet forwarding units 50, and a description thereof is therefore omitted.

When the network switching device 10 receives a VRRP packet having "1" stored in the type 904, the network switching device 10 reads all the areas 902 to 924 of the received VRRP packet.

When the network switching device 10 receives a VRRP packet having "2" stored in the type 904, the network switching device 10 may not read areas (the virtual router identifier 906, the priority 908, the count IP address 910, and the advertisement interval 914) which do not relate to a change in the power state.

As a result, the VRRP packets transmitted/received between the network switching devices 10 for configuring the network 1 to be redundant by using the VRRP can be used to notify the backup network switching device 10B of the change in the power state of the master network switching device 10A.

Figure 9:
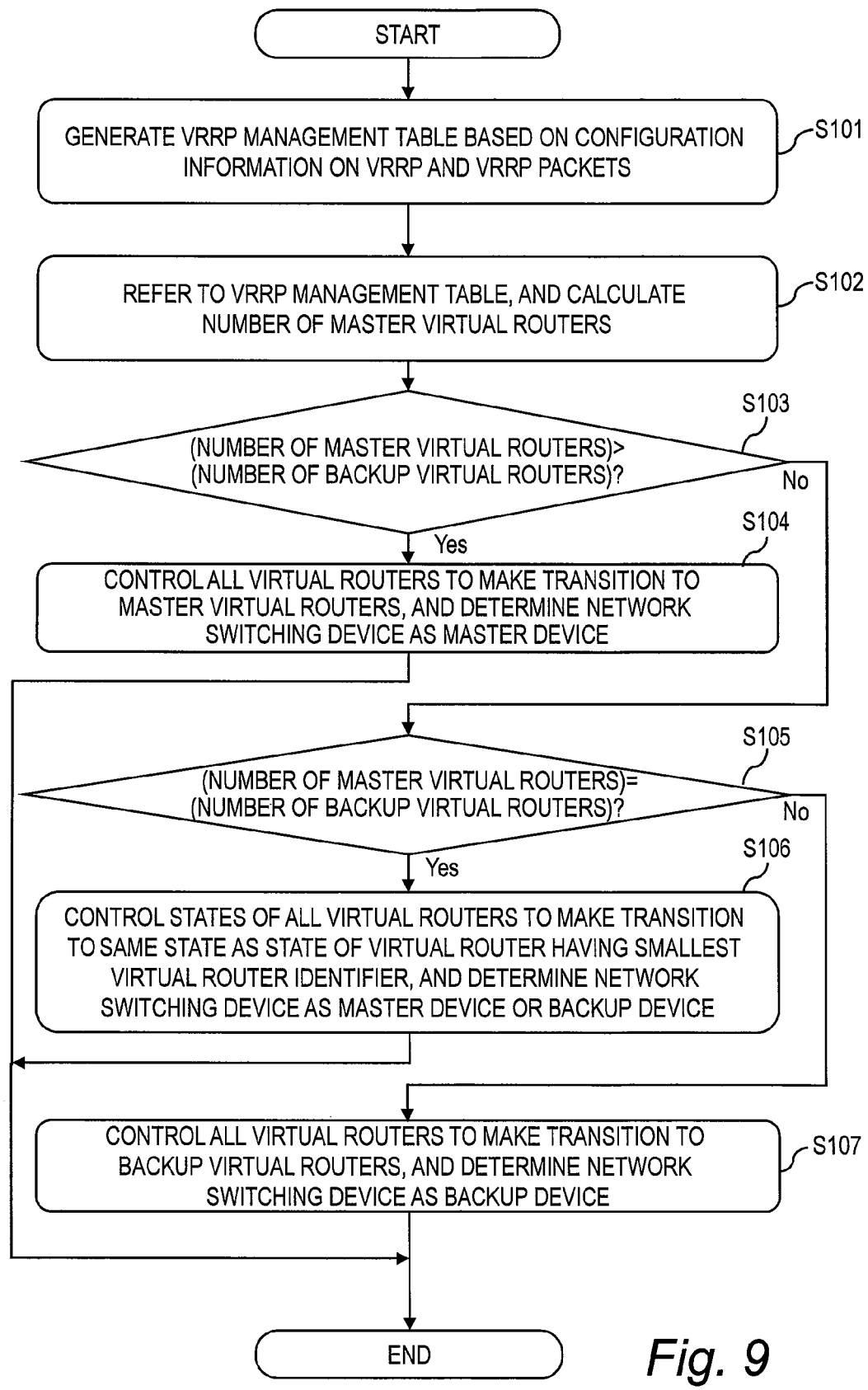
FIG. 9 is a flowchart of a master-backup determination processing by protocol control units according to the first embodiment of this invention.

FIG. 9 is a flowchart of master-backup determination processing by the protocol control units 30 according to the first embodiment of this invention.

The master-backup determination processing is carried out at a timing when the network switching devices 10A and 10B can communicate with each other by the protocol control units 30 of the respective network switching devices 10A and 10B.

The user sets a configuration to the network switching device 10 in order to configure the network switching device 10 to be redundant. The configuration includes the virtual router identifiers and priorities of the virtual routers set on the network switching device 10. Moreover, the network switching device 10 receives the VRRP packet from the other network switching device 10. The VRRP packet includes, as described above, the virtual router identifiers and priorities of the virtual routers set on the other network switching device 10.

The protocol control unit 30 generates the VRRP management table 300 when the network switching device 10 receives the setting of the configuration made by the user, and the VRRP packet from the other network switching device 10 (S101).

Specifically, the protocol control unit 30 registers the virtual router identifiers included in the configuration to the virtual router identifiers 302 of the VRRP management table 300, and the priorities included in the configuration to the priorities 306. Moreover, the protocol control unit 30 registers the virtual router identifiers included in the received VRRP packet to the virtual router identifiers 302 of the VRRP management table 300, and the priorities included in the received VRRP packet to the priorities 306.

Then, the protocol control unit 30 compares priorities registered to the priorities 306 in records having matching virtual router identifiers registered to the virtual router identifiers 302 in the VRRP management table 300. The protocol control unit 30 determines that the virtual router higher in priority operates as the master virtual router, and registers "MASTER" to the state of virtual router 304 of the record higher in priority. On the other hand, the protocol control unit 30 determines that the virtual router lower in priority operates as the backup virtual router, and registers "BACKUP" to the state of virtual router 304 of the record lower in priority.

Then, the protocol control unit 30 refers to the VRRP management table 300, and calculates the number of virtual routers operating as the master virtual routers out of the virtual routers set on the network switching device 10 including the protocol control unit 30 itself (S102). The protocol control unit 30 can calculate the number of the backup virtual routers set on the network switching device 10 by subtracting the number of the master virtual routers from the number of all the virtual routers set on the network switching device 10 including the protocol control unit 30 itself.

Then, the protocol control unit 30 determines whether or not the number of the master virtual routers is larger than the number of the backup virtual routers (S103).

In the processing in S103, when the protocol control unit 30 determines that the number of the master virtual routers is larger than the number of the backup virtual routers (Yes in S103), the protocol control unit 30 determines to operate all the virtual routers set on the network switching device 10 including the protocol control unit 30 itself as master virtual routers, and to operate the network switching device 10 as the master network switching device (S104), and finishes the master-backup determination processing.

On the other hand, in the processing in S103, when the protocol control unit 30 determines that the number of the master virtual routers is equal to or less than the number of the backup virtual routers (No in S103), the protocol control unit 30 determines whether or not the number of the master virtual routers is equal to the number of the backup virtual routers (S105).

In the processing in S105, when the protocol control unit 30 determines that the number of the master virtual routers and the number of the backup virtual routers are equal to each other (Yes in S105), the protocol control unit 30 determines to control all the virtual routers set on the network switching device 10 including the protocol control unit 30 itself to transition to the same state as the state of a virtual router identified by the smallest virtual router identifier, and to operate the network switching device 10 as the master network switching device or the backup network switching device (S106), and finishes the master-backup determination processing.

Specifically, if the virtual router identified by the smallest virtual router identifier is operating as the master virtual router, the protocol control unit 30 operates all the virtual routers set on the network switching device 10 as the master virtual routers, and operates the network switching device 10 as the master network switching device. On the other hand, if the virtual router identified by the smallest virtual router identifier is operating as the backup virtual router, the protocol control unit 30 operates all the virtual routers set on the network switching device 10 as the backup virtual routers, and operates the network switching device 10 as the backup network switching device.

It should be noted that the smallest virtual router identifier is a virtual router identifier at the first place if alphabetical or numerical characters constituting the virtual router identifiers are sorted in the ascending order.

Moreover, in the processing in S106, the virtual router having the state to which all the virtual routers set on the network switching device 10 are controlled to transition is not limited to the virtual router having the smallest virtual router identifier, but can be a virtual router identified by an arbitrary virtual router identifier. In this case, in order to prevent the network switching devices 10A and 10B from operating in the same state, namely, for example, to prevent both the network switching devices 10A and 10B from operating as the master network switching devices, on the network switching devices 10A and 10B, it is necessary to control the virtual routers to transition to the state of the virtual router identified by the same virtual router identifier.

On the other hand, in the processing in S105, when the protocol control unit 30 determines that the number of the master virtual routers and the number of the backup virtual routers are not equal to each other (No in S105), the number of the master virtual routers is smaller than the number of the backup virtual routers, and hence the protocol control unit 30 determines to operate all the virtual routers set on the network switching device 10 including the protocol control unit 30 itself as backup virtual routers, and to operate the network switching device as the backup network switching device (S107), and finishes the master-backup determination processing.

It should be noted that the same processing is carried out on the network switching devices 10A and 10B, and hence, for example, if the network switching device 10A operates as the master network switching device, the network switching device 10B operates as the backup network switching device.

As a result, even if virtual routers operating as master virtual routers and virtual routers operating as backup virtual routers simultaneously exist on a single network switching device 10, based on the priorities set by the user to the virtual routers, the network switching device 10 can be determined to operate as the master network switching device or the backup network switching device.

Figure 10:
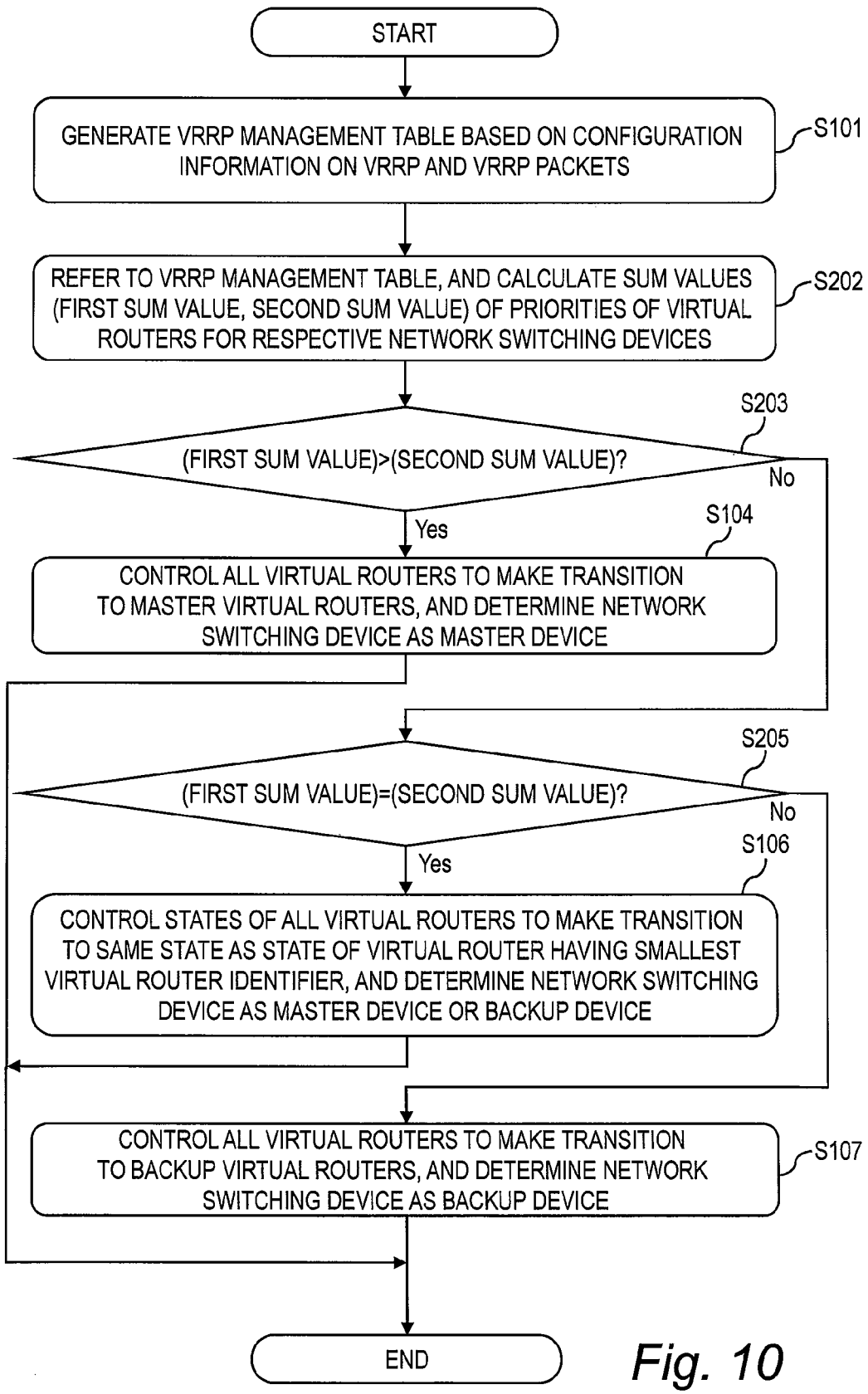
FIG. 10 is a flowchart of a modified example of a master-backup determination processing by a protocol control unit according to the first embodiment of this invention.

FIG. 10 is a flowchart of a modified example of the master-backup determination processing by the protocol control unit 30 according to the first embodiment of this invention. It should be noted that, out of the processing illustrated in FIG. 10, the same pieces of processing as those of FIG. 9 are denoted by the same numerals, and a description thereof is therefore omitted.

In FIG. 9, the protocol control unit 30 determines, based on the number of the master virtual routers or the backup virtual routers, whether the network switching device 10 including the protocol control unit 30 itself operates as the master network switching device or the backup network switching device, but in FIG. 10, the protocol control unit 30 determines, based on a sum value of the priorities of the virtual routers, whether the network switching device 10 including the protocol control unit 30 itself operates as the master network switching device or the backup network switching device.

After the VRRP management table is generated in the processing in S101, the protocol control unit 30 refers to the VRRP management table 300 and calculates the sum values of the priorities of the virtual routers set on the respective network switching devices 10 (S202). For simplifying the description, the sum value of the priorities of the virtual routers set on the network switching device 10 including the protocol control unit 30 is referred to as first sum value, and the sum value of the priorities of the virtual routers set on the other network switching device 10 is referred to as second sum value.

Then, the protocol control unit 30 determines whether or not the first sum value is larger than the second sum value (S203).

In the processing in S203, when the protocol control unit 30 determines that the first sum value is larger than the second sum value (Yes in S203), the processing proceeds to the processing in S104, and the protocol control unit 30 determines to operate all the virtual routers set on the network switching device 10 including the protocol control unit 30 itself as master virtual routers, and to operate the network switching device as the master network switching device, and finishes the master-backup determination processing.

In the processing in S203, when the protocol control unit 30 determines that the first sum value is equal to or less than the second sum value (No in S203), the protocol control unit 30 determines whether or not the first sum value and the second sum value are equal to each other (S205).

In the processing in S205, when the protocol control unit 30 determines that the first sum value and the second sum value are equal to each other (Yes in S205), the processing proceeds to the processing in S106, and the protocol control unit 30 determines to control all the virtual routers set on the network switching device 10 including the protocol control unit 30 itself to transition to the same state as the state of a virtual router identified by the smallest virtual router identifier, and to operate the network switching device 10 as the master network switching device or the backup network switching device, and finishes the master-backup determination processing.

On the other hand, in the processing in S205, when the protocol control unit 30 determines that the first sum value and the second sum value are not equal to each other (Yes in S205), the first sum value is smaller than the second sum value, and hence the processing proceeds to the processing in S107, and the protocol control unit 30 determines to operate all the virtual routers set on the network switching device 10 including the protocol control unit 30 itself as backup virtual routers, and to operate the network switching device as the backup network switching device, and finishes the master-backup determination processing.

As a result, based on the sum values of the priorities of the virtual routers, the network switching device 10 can determine whether the network switching device 10 itself operates as the master network switching device or the backup network switching device.

The two pieces of the master-backup determination processing illustrated in FIGS. 9 and 10 are common in such a point that, based on the priorities of the virtual routers set by the user, it is determined whether the network switching device 10 operates as the master network switching device or the backup network switching device.

Figure 11:
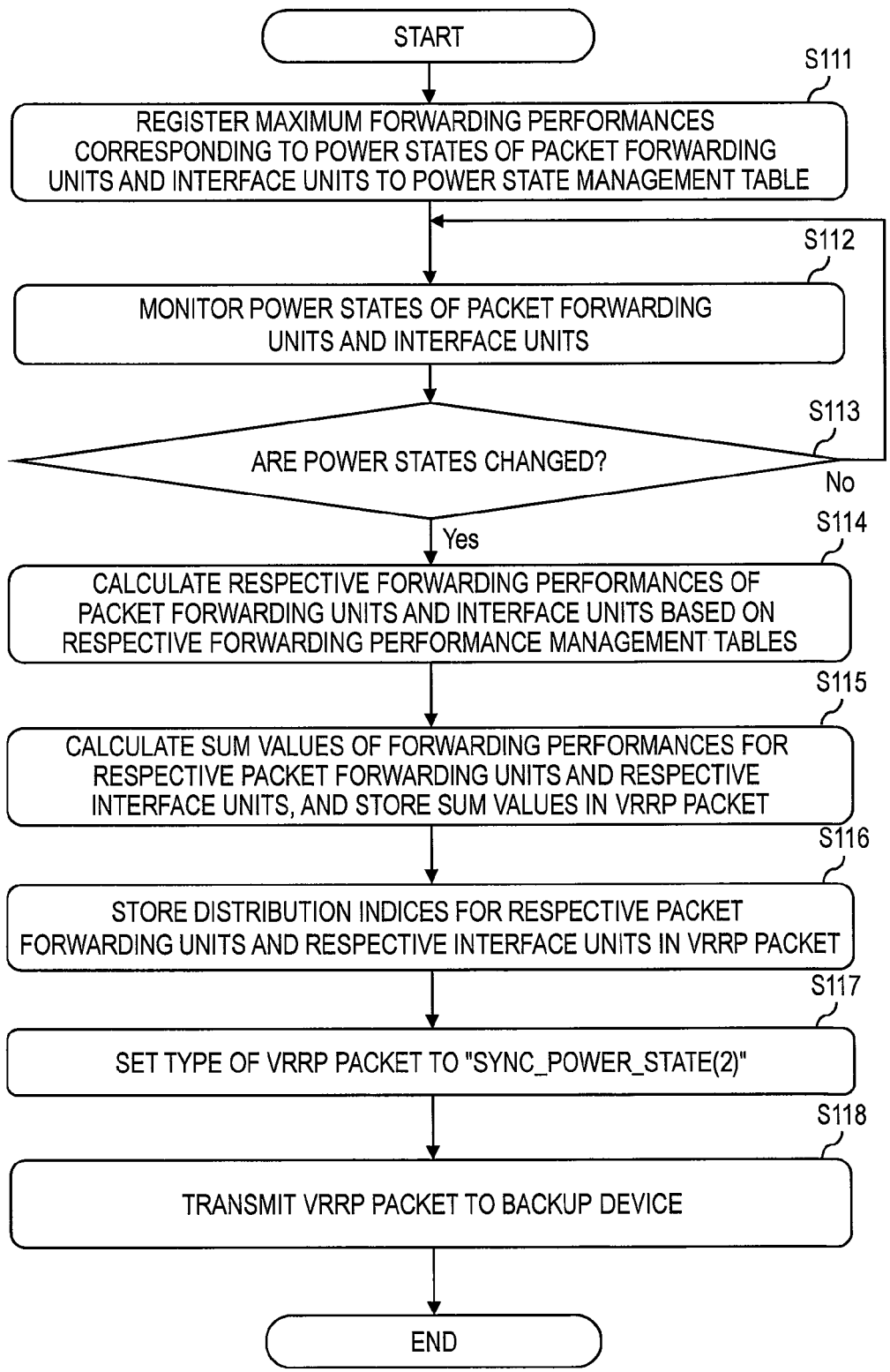
FIG. 11 is a flowchart of a power state change notification processing by a power control unit according to the first embodiment of the present invention.

FIG. 11 is a flowchart of power state change notification processing by the power control unit 40 according to the first embodiment of the present invention.

The power state change notification processing is carried out by the power control unit 40 of the network switching device 10 operating as the master network switching device. The power state change notification processing is processing in which the master network switching device notifies, when at least one of the power states of the packet forwarding units 50 included in the master network switching device itself, or the power states of the network interface units 60 included therein is changed, in order to change the power states of the backup network switching device, the backup network switching device of the forwarding performances of the packet forwarding units 50 and the forwarding performances of the network interface units 60 after the change in the power state.

First, the power control unit 40 registers the current power states set to the packet forwarding units 50 and the network interface units 60 to the power states 406 of the power state management table 400, and registers the forwarding performances corresponding to the current power states set to the packet forwarding units 50 and the network interface units 60 to the maximum forwarding performances 404 of the power state management table 400 (S111).

Then, the power control unit 40 monitors the power states of the packet forwarding units 50 and the network interface units 60 (S112). Then, the power control unit 40 determines whether or not at least one of the power states of the packet forwarding units 50 and the power states of the network interface units 60 as a monitoring result is changed from the power states of the packet forwarding units 50 and the network interface units 60 in the power state management table 400 (S113). It should be noted that, for simplifying the description, at least one of the packet forwarding units 50 and the network interface units 60 changed in power state is referred to as power state control subject changed in power state.

When the power control unit 40 determines that at least one of the power states of the packet forwarding units 50 and the power states of the network interface units 60 is changed (Yes in S113), the power control unit 40 refers to a table corresponding to the power state control subject changed in power state out of the packet forwarding unit forwarding performance management table 410 and the network interface unit forwarding performance management table 420, calculates a forwarding performance corresponding to the power state after the change, and updates the maximum forwarding performance 404 and the power state 406 of a record corresponding to the power state control subject changed in power state in the power state management table 400 (S114), and the processing proceeds to the processing in S115.

Specifically, when the power state of the packet forwarding unit 50 is changed, the power control unit 40 refers to the packet forwarding unit forwarding performance management table 410, and calculates the forwarding performance of the packet forwarding unit 50 corresponding to the power state after the change. Then, the power control unit 40 registers the calculated forwarding performance to the maximum forwarding performance 404 of the record of the packet forwarding unit 50 changed in the power state in the power state management table 400, and registers the power state after the change to the power state 406 of the record.

Further when the power state of the network interface unit 60 is changed, the power control unit 40 refers to the network interface unit forwarding performance management table 420, and calculates the forwarding performance of the network interface unit 60 corresponding to the power state after the change. Then, the power control unit 40 registers the calculated forwarding performance to the maximum forwarding performance 404 of the record of the network interface unit 60 changed in the power state in the power state management table 400, and registers the power state after the change to the power state 406 of the record.

On the other hand, in the processing in S113, when the power control unit 40 determines that the power states of the packet forwarding units 50 and the power states of the network interface units 60 are not changed (No in S113), the processing returns to the processing in S112.

Then, the processing calculates a sum value of the forwarding performances of the packet forwarding units 50 registered to the power state management table 400, and stores the calculated sum value of the forwarding performances of the packet forwarding units 50 in the packet forwarding unit forwarding performance 918 of the VRRP packet. Moreover, the power control unit 40 calculates a sum value of the forwarding performances of the network interface units 60 registered to the power state management table 400, and stores the calculated sum value of the forwarding performances of the network interface units 60 in the network interface unit forwarding performance 922 of the VRRP packet (S115).

Then, the power control unit 40 stores the distribution index of the forwarding performance for the packet forwarding units 50 included in the configuration set by the user in the packet forwarding unit distribution index 920 of the VRRP packet, and stores the distribution index of the forwarding performance for the network interface units 60 included in the configuration in the network interface unit distribution index 924 of the VRRP packet (S116).

Then, the power control unit 40 stores "2" in the type 904 of the VRRP packet (S117), transmits the VRRP packet to the network switching device 10 operating as the backup network switching device, and finishes the power state change notification processing.

Figure 12:
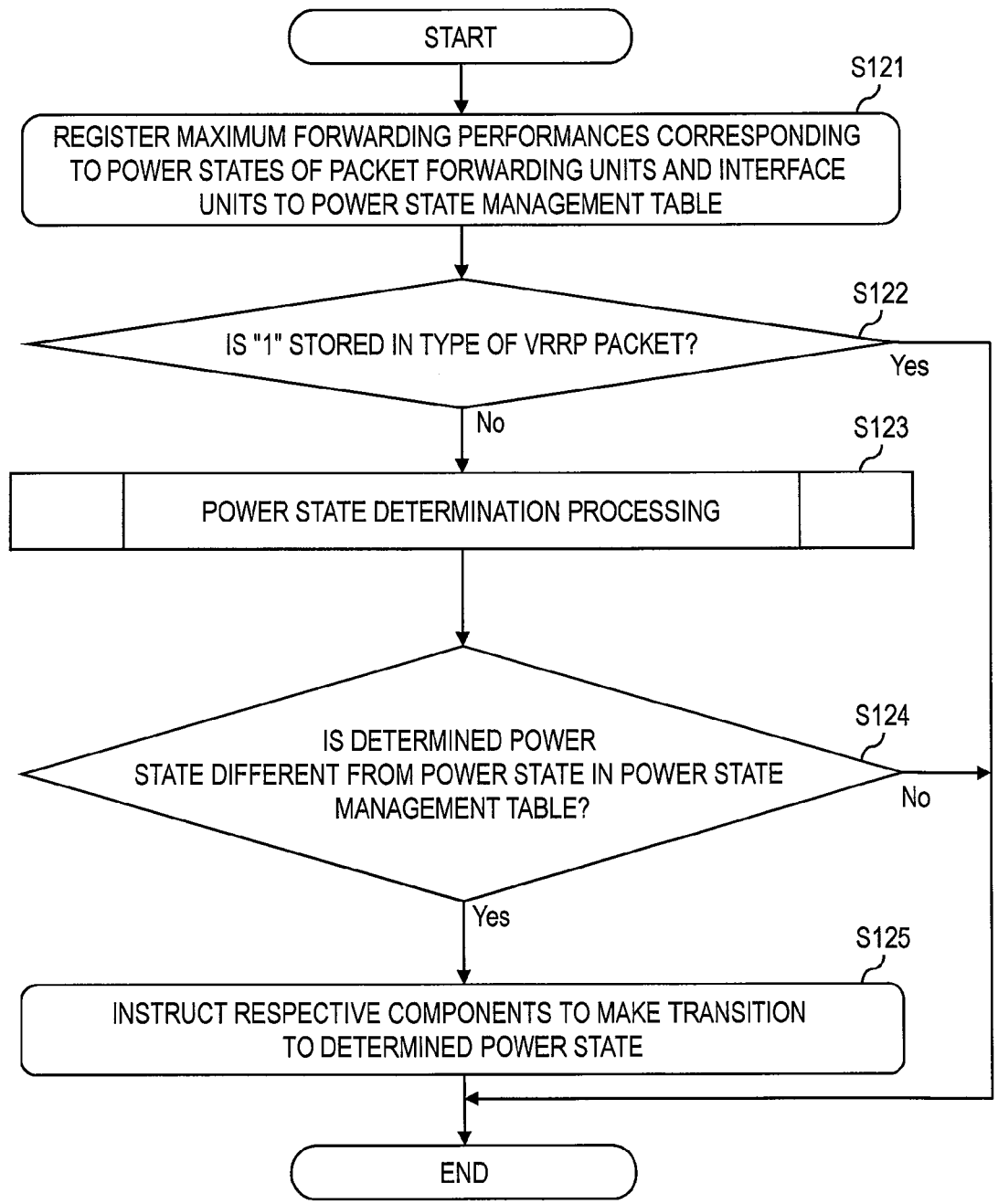
FIG. 12 is a flowchart of a power saving processing by the power control unit according to the first embodiment of this invention.

FIG. 12 is a flowchart of power saving processing by the power control unit 40 according to the first embodiment of this invention.

When the network switching device 10 operating as the backup network switching device receives the VRRP packet, the power saving processing is carried out by the power control unit 40 of the network switching device 10.

First, the power control unit 40 registers the current power states set to the packet forwarding units 50 and the network interface units 60 to the power states 406 of the power state management table 400, and registers the forwarding performances corresponding to the current power states set to the packet forwarding units 50 and the network interface units 60 to the maximum forwarding performances 404 of the power state management table 400 (S121).

Then, the power control unit 40 determines whether or not "1" is stored in the type 904 of the received VRRP packet (S122).

In the processing in S122, when the power control unit 40 determines that "1" is stored in the type 904 of the received VRRP packet (Yes in S122), the power control unit 40 does not need to change the power states of the packet forwarding units 50 and the network interface units 60 of the backup network switching device, and thus finishes the power saving processing.

Figure 13:
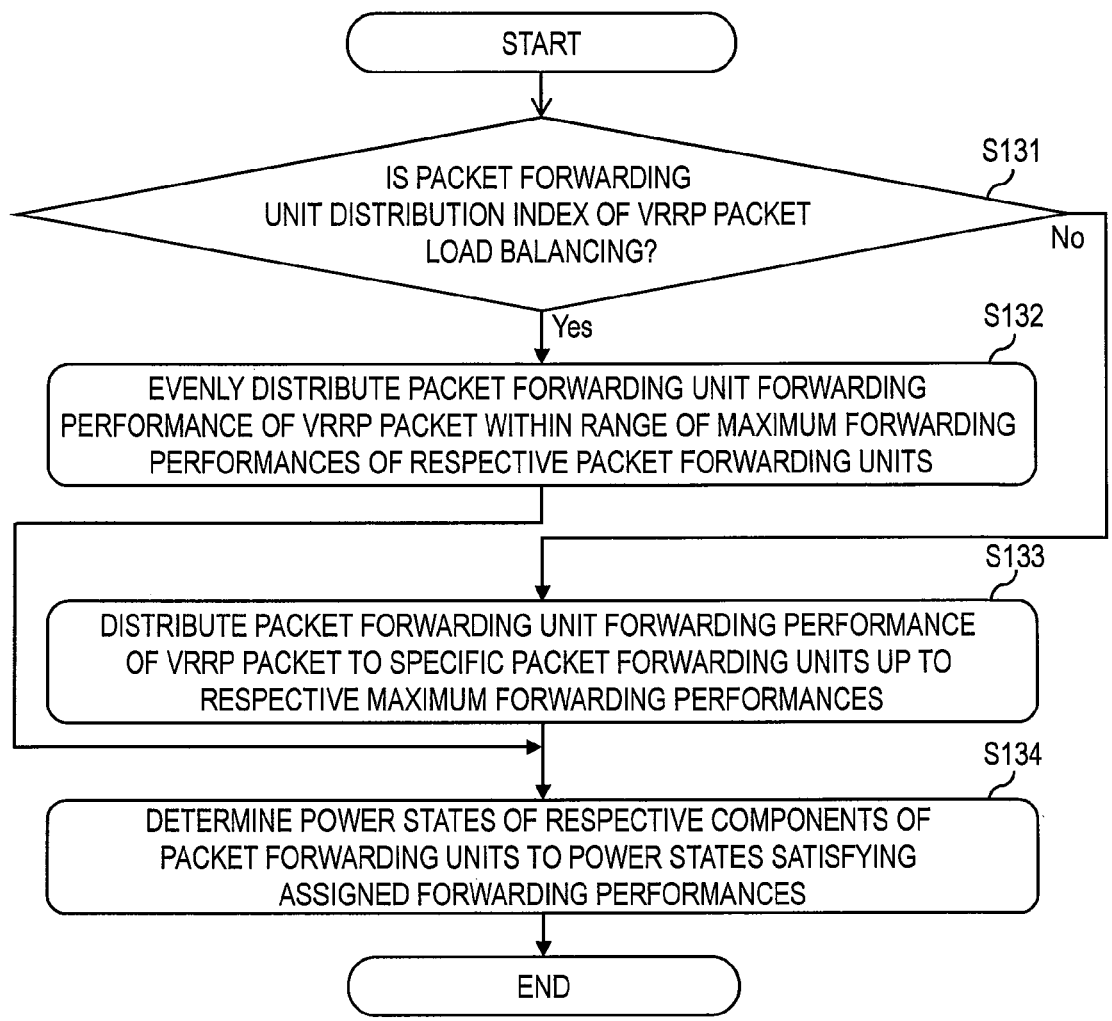
FIG. 13 is a flowchart of a power state determination processing by the power control unit according to the first embodiment of this invention.

On the other hand, in the processing in S122, when the power control unit determines that "1" is not stored in the type 904 of the received VRRP packet (No in S122), namely, "2" is stored in the type 904, the power control unit 40 carries out power state determination processing for determining the power states of the packet forwarding units 50 and the network interface units 60 so that the forwarding performance stored in the packet forwarding unit forwarding performance 918 and the forwarding performance stored in the network interface unit forwarding performance 922 of the received VRRP packet are satisfied (S123). Referring to FIG. 13, a detailed description is later given of the power state determination processing.

Then, the power control unit 40 determines whether or not the power states of the packet forwarding units 50 and the network interface units 60 determined by the processing in S123 are changed from the power states registered to the power state management table 400 (S124).

In the processing in S124, when the power control unit 40 determines that the power states of the packet forwarding units 50 and the network interface units 60 determined by the processing in S123 are changed from the power states registered to the power state management table 400 (Yes in S124), the power control unit 40 instructs the packet forwarding units 50 and the network interface units 60 to change the power states of the packet forwarding units 50 and the network interface units 60 (S125) to the power states determined by the processing in S123, and finishes the power saving processing.

On the other hand, in the processing in S124, when the power control unit 40 determines that the power states of the packet forwarding units 50 and the network interface units 60 determined by the processing in S123 are not changed from the power states registered to the power state management table 400 (No in S124), the power control unit 40 does not need to change the power states of the packet forwarding units 50 and the network interface units 60 of the backup network switching device, and thus finishes the power saving processing.

FIG. 13 is a flowchart of the power state determination processing by the power control unit 40 according to the first embodiment of this invention.

First, the power control unit 40 determines whether or not the value representing the load balancing type is registered to the packet forwarding unit distribution index 920 of the received VRRP packet (S131).

In the processing in S131, when the power control unit 40 determines that the value representing the load balancing type is registered to the packet forwarding unit distribution index 920 of the received VRRP packet (Yes in S131), the power control unit 40 uniformly assigns the sum value of the forwarding performances stored in the packet forwarding unit forwarding performance 918 of the received VRRP packet to the packet forwarding units 50 included in the network switching device 10 operating as the backup network switching device within the maximum forwarding performances of the respective packet forwarding units 50 (S132), and the processing proceeds to processing in S134. It should be noted that the maximum forwarding performance of the packet forwarding unit 50 is the forwarding performance when the power state of the packet forwarding unit 50 is "high".

On the other hand, in the processing in S131, when the power control unit 40 determines that the value representing the load balancing type is not registered to the packet forwarding unit distribution index 920 of the received VRRP packet (No in S131), the value representing the aggregate type is registered to the packet forwarding unit distribution index 920, and hence the power control unit 40 assigns the sum value of the forwarding performances stored in the packet forwarding unit forwarding performance 918 of the received VRRP packet to the packet forwarding units 50 in a specific prioritized order (S133), and the processing proceeds to processing in S134. Specifically, the power control unit 40 assigns the sum value of the forwarding performances stored in the packet forwarding unit forwarding performance 918 of the received VRRP packet to the packet forwarding unit 50 highest in the priority up to the maximum forwarding performance, and assigns, if the sum value still remains, the forwarding performance to the packet forwarding unit 50 second highest in the priority.

Then, the power control unit 40 refers to the packet forwarding unit forwarding performance management table 410, and determines the power states of the packet forwarding units 50 satisfying the forwarding performances assigned by the processing in S132 or the processing in S133 (S134), and finishes the power state determination processing.

In FIG. 13, a description has been given of the processing of determining the power states of the packet forwarding units 50, but the power states of the network interface units 60 can be determined by the same processing as that of FIG. 13, and a description thereof is therefore omitted.

As described above, according to this embodiment, when the power state of at least one of the packet forwarding units 50 and the network interface units 60 is changed, the master network switching device transmits the forwarding performance of the packet forwarding unit 50 or the forwarding performance of the network interface unit 60 in the power state after the change to the backup network switching device. When the backup network switching device is notified of the forwarding performance, the backup network switching device changes the power state of the packet forwarding unit 50 or the network interface unit 60 so that the forwarding performance which the backup network switching device is notified of is satisfied. As a result, the backup network switching device can change the power state of the packet forwarding unit 50 or the network interface unit 60 while the forwarding performance of the master network switching device after the change of the power state is satisfied, and can thus reduce the power consumption of the backup network switching device while a packet loss is prevented when an abnormality occurs in the master network switching device.

Moreover, according to this embodiment, even if virtual routers set on a single network switching device 10 include both master virtual routers and backup virtual routers, the network switching device 10 determines, based on the priorities of the virtual routers, whether the network switching device 10 itself operates as the master network switching device or as the backup network switching device. As a result, it is possible to determine whether the network switching device 10 operates as the master network switching device or the backup network switching device by reflecting the priorities set by the user to the virtual routers.

Moreover, according to this embodiment, the notification of the forwarding performances transmitted from the master network switching device includes the information for identifying whether the assignment type of the forwarding performance to the packet forwarding units 50 and the network interface units 60 in the backup network switching device is the load balancing type or the aggregate type, and the backup network switching device assigns the forwarding performance to the packet forwarding units 50 and the network interface units 60 by using the type included in the notification of the forwarding performance, and determines the power states of the packet forwarding units 50 and the network interface units 60. Whether the power is saved more by employing the load balancing type or the aggregate type depends on a configuration of the backup network switching unit 10, and the user can thus select a type for efficiently saving the power depending on the configuration of the backup network switching device 10.

Further, according to this embodiment, by using the format of the existing VRRP packet transmitted/received between the network switching devices 10 configured to be redundant by means of the VRRP, the master network switching device notifies the backup network switching device of the forwarding performances, and hence this embodiment can be applied to existing network switching devices 10 compliant with the VRRP.

(Second Embodiment)

Figure 14:
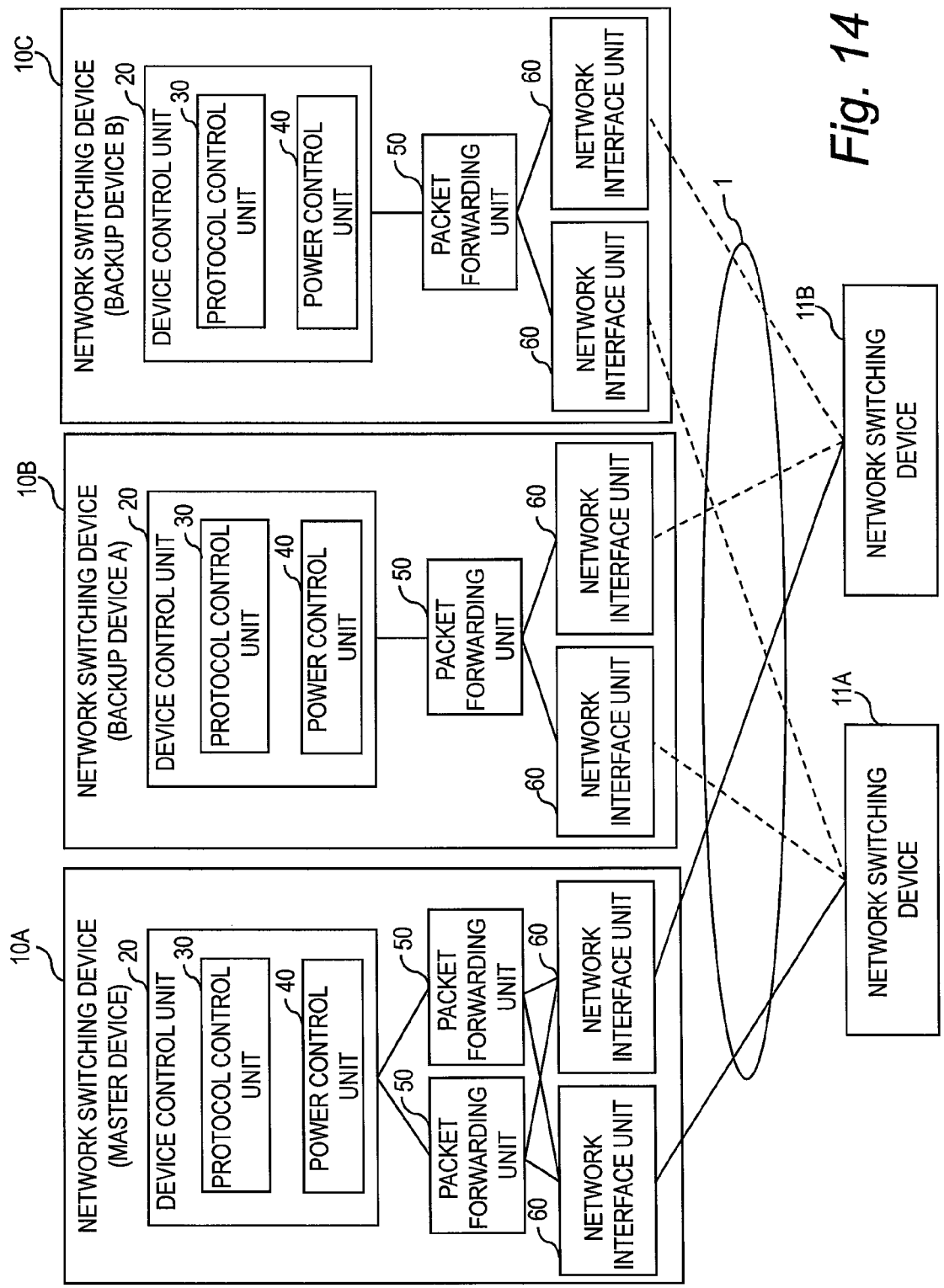
FIG. 14 is a configuration diagram of a network according to a second embodiment of this invention.
Figure 15:
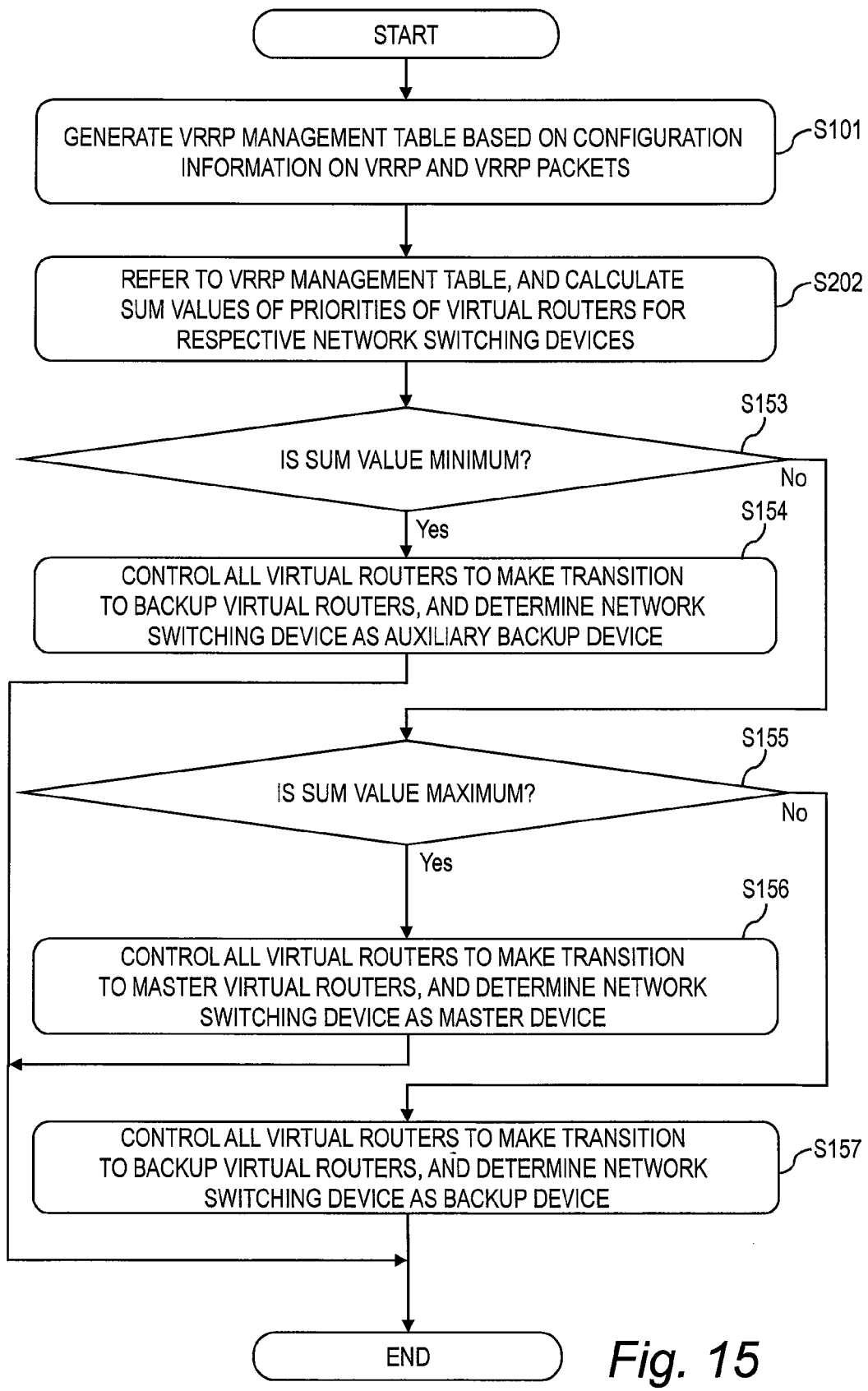
FIG. 15 is a flowchart of a master-backup determination processing by a protocol control unit according to the second embodiment of this invention.

Referring to FIGS. 14 and 15, a description is now given of a second embodiment of this invention. According to this embodiment, the network 1 is configured to be redundant by three or more network switching devices 10, and if there are one master network switching device and a plurality of backup network switching devices, at least one backup network switching device out of the plurality of backup network switching devices is set as an auxiliary backup network switching device in a power state having the minimum power consumption. As a result, if the network 1 is configured to be redundant by three or more network switching devices 10, compared with the case where all the backup network switching devices are operated by the method according to the first embodiment, the power consumption of the network switching device 10 can be reduced.

FIG. 14 is a configuration diagram of the network 1 according to the second embodiment of this invention. Out of the configuration of the network 1 illustrated in FIG. 14, the same portions as those of the network illustrated in FIG. 1 are denoted by the same numerals, and a description thereof is therefore omitted.

In FIG. 14, the network 1 is configured to be redundant by three network switching devices 10A to 10C. The network switching device 10A operates as the master network switching device, and the network switching devices 10B and 10C operate as the backup network switching devices.

As a result, even if an abnormality occurs in the network switching device 10A operating as the master network switching device, the network 1 can be configured to be redundant by the network switching devices 10B and 10C, and hence if an abnormality occurs in one network switching device 10, reliability of communication can be secured.

FIG. 15 is a flowchart of a master-backup determination processing by the protocol control unit 30 according to the second embodiment of this invention. It should be noted that, out of the processing illustrated in FIG. 15, the same pieces of processing as those of FIGS. 9 and 10 are denoted by the same numerals, and a description thereof is therefore omitted.

After the VRRP management table is generated in the processing in S101, in the processing in S202, the protocol control unit 30 calculates the sum values of the priorities of the virtual routers set on the respective network switching devices 10.

Then, the protocol control unit 30 compares the sum value of the priorities of the network switching device 10 including the protocol control unit 30 itself, and the sum values of the priorities of the other network switching devices 10 with each other, thereby determining whether or not the sum value of the priorities of the network switching device 10 including the protocol control unit 30 itself is the minimum (S153).

In the processing in S153, when the protocol control unit 30 determines that the sum value of the priorities of the network switching device 10 including the protocol control unit 30 itself is the minimum (Yes in S153), the protocol control unit 30 determines to operate all the virtual routers set on the network switching device 10 including the protocol control unit 30 itself as the backup virtual routers, and to operate the network switching device as the auxiliary backup network switching device (S154), and finishes the master-backup determination processing.

The auxiliary backup network switching device is a type of the backup network switching device which does not carry out the network switching for the packet, and is different from the backup network switching device described above in the first embodiment in that the power states of the packet forwarding units 50 and the network interface units 60 are controlled to transition to power states minimum in power consumption. In the processing in S154, when the power control unit 40 determines to operate the network switching device as the auxiliary backup network switching device, the power control 40 controls the power states of the packet forwarding units 50 and the network interface units 60 included in the network switching device 10 including the power control unit 40 itself to transition to the power state (softoff) minimum in power consumption.

On the other hand, in the processing in S153, when the protocol control unit 30 determines that the sum value of the priorities of the network switching device 10 including the protocol control unit 30 itself is not the minimum (No in S153), the protocol control unit 30 determines whether or not the sum value of the priorities of the network switching device 10 including the protocol control unit 30 itself is the maximum (S155).

In the processing in S155, when the protocol control unit 30 determines that the sum value of the priorities of the network switching device 10 including the protocol control unit 30 itself is the maximum (Yes in S155), the protocol control unit 30 determines to operate all the virtual routers set on the network switching device 10 including the protocol control unit 30 itself as the master virtual routers, and to operate the network switching device as the master network switching device (S156), and finishes the master-backup determination processing.

On the other hand, in the processing in S155, when the protocol control unit 30 determines that the sum value of the priorities of the network switching device 10 including the protocol control unit 30 itself is not the maximum (No in S155), the protocol control unit 30 determines to operate all the virtual routers set on the network switching device 10 including the protocol control unit 30 itself as the backup virtual routers, and to operate the network switching device as a normal backup network switching device (S157), and finishes the master-backup determination processing. On this occasion, the normal backup network switching device refers to the backup network switching device according to the first embodiment.

As described above, based on the priorities of the virtual routers set by the user, the network switching device 10 is determined to operate as any one of the master network switching device, the normal backup network switching device, and the auxiliary backup network switching device. As a result, by setting low priorities to the virtual routers of the network switching device 10 which the user wants to operate as the auxiliary backup network switching device, the user can operate the intended network switching device 10 as the auxiliary backup network switching device.

If there are four or more network switching devices 10, a network switching device 10 having the maximum sum value of the priorities of the virtual routers may be operated as the master network switching device, a network switching device 10 having the second maximum sum value of the priorities of the virtual routers may be operated as the normal backup network switching device, and the other network switching devices 10 may be operated as the auxiliary backup network switching devices.

A description is now given of operations of the normal backup network switching device and the auxiliary backup network switching device when an abnormality occurs in the master network switching device.

The normal backup network switching device detects that an abnormality occurs in the master network switching device when not receiving the VRRP packet transmitted at each predetermined time interval from the master network switching device for the predetermined time interval or longer. In this case, the normal backup network switching device notifies the auxiliary backup network switching device of the occurrence of the abnormality, and transmits a failure notification (such as wake on lan (WOL) packet) for activating the auxiliary backup network switching device. It should be noted that the failure notification includes the sum value of the forwarding performances of the packet forwarding units 50 and the sum value of the forwarding performances of the network interface units 60 of the normal backup network switching device.

When the auxiliary backup network switching device receives the failure notification, the auxiliary backup network switching device changes the power states of the packet forwarding units 50 so as to satisfy the sum value of the forwarding performances of the packet forwarding units 50 included in the failure notification, and changes the power states of the network interface units 60 so as to satisfy the sum value of the forwarding performances of the network interface units 60 included in the failure notification.

As described above, according to this embodiment, if the network 1 is configured to be redundant by three or more network switching devices 10, at least one of the network switching devices 10 is set as the auxiliary backup network switching device, and hence an increase in power saving is realized.

Moreover, the backup network switching device transmits the failure notification including the sum value of the forwarding performances of the packet forwarding units 50 and the sum value of the forwarding performances of the network interface units 60, and hence the auxiliary backup network switching device can determine the power states of the packet forwarding units 50 and the network interface units 60 so as to satisfy the forwarding performances of the backup network switching device.

(Third Embodiment)

In a third embodiment of this invention, in a case where the network 1 is configured to be redundant by the two network switching devices 10 as in the first embodiment, the power states of the packet forwarding units 50 and the network interface units 60 included in the network switching device 10 determined to operate as the backup network switching device are determined to be power states which minimize the power consumption. As a result, the power of the network switching device 10 can further be saved.

While the power states of the packet forwarding units 50 and the network interface units 60 of the auxiliary backup network switching device are set to softoff in the second embodiment, according to this embodiment, the backup network switching device needs to detect occurrence of an abnormality on the master network switching device. When the power states of the packet forwarding units 50 and the network interface units 60 of the backup network switching device are set to softoff, the backup network switching device cannot receive the VRRP packet transmitted from the master network switching device, and cannot thus detect the occurrence of an abnormality on the master network switching device.

Therefore, according to this embodiment, the power states of the packet forwarding units 50 and the network interface units 60 of the backup network switching device are set to the power state (lowMinus) where the packet from the master network switching device can be received, and the power consumption is minimum. According to this embodiment, this power state, namely, lowMinus, is the power state where the power consumption is the minimum.

A description is now given of a change of the power states of the packet forwarding units 50 and the network interface units 60 in the backup network switching device in which the power states of the packet forwarding units 50 and the network interface units 60 are set to the power states providing the minimum power consumption. The change of the power state of the backup network switching device is carried out by a first method and a second method.

In the first method, if the power state of the master network switching device is changed, each time the backup network switching device receives the VRRP packet transmitted from the master network switching device, the backup network switching device determines, based on the distribution index stored in the packet forwarding unit distribution index 920, the power states of the packet forwarding units 50 so as to satisfy the forwarding performance stored in the packet forwarding unit forwarding performance 918 included in the received VRRP packet, and determines, based on the distribution index stored in the network interface unit distribution index 924, the power states of the network interface units 60 so as to satisfy the forwarding performance stored in the network interface unit forwarding performance 922 included in the received VRRP packet.

In the second method, if the occurrence of an abnormality on the master network switching device is detected, the backup network switching device determines, based on the distribution index stored in the packet forwarding unit distribution index 920, the power states of the packet forwarding units 50 so as to satisfy the forwarding performance stored in the packet forwarding unit forwarding performance 918 included in the VRRP packet received most recently, and determines, based on the distribution index stored in the network interface unit distribution index 924, the power states of the network interface units 60 so as to satisfy the forwarding performance stored in the network interface unit forwarding performance 922 included in the received VRRP packet.

In the first method, the packet forwarding units 50 and the network interface units 60 of the backup network switching device satisfy the forwarding performances of the packet forwarding units 50 and the network interface units 60 of the master network switching device, and hence even if an abnormality occurs in the master network switching device, a packet loss does not occur in the backup network switching device.

In the second method, at a time point when an abnormality occurs in the master network switching device, the packet forwarding units 50 and the network interface units 60 of the backup network switching device do not satisfy the forwarding performances of the packet forwarding units 50 and the network interface units 60 of the master network switching device, and hence a packet loss can occur in the backup network switching device. However, in the second method, until an abnormality occurs in the master network switching device, the power states of the packet forwarding units 50 and the network interface units 60 of the backup network switching device are maintained to the power states which provide the minimum power consumption, and can save more power than the first method.

The redundancy protocol for this invention is not limited to the VRRP, and this invention can be applied to redundancy protocols other than the VRRP. Moreover, this invention can be applied to a case where three or more network switching devices 10 are configured to be redundant.

While the present invention has been described in detail and pictorially in the accompanying drawings, the present invention is not limited to such detail but covers various obvious modifications and equivalent arrangements, which fall within the purview of the appended claims.

What is claimed is:

1. A first network switching device communicable to and from a second network switching device of which at least one of a device configuration and a device performance is different from the first network switching device, comprising:
    a plurality of network interface units for transmitting and receiving a packet to and from a network;
    a packet forwarding unit for determining a forwarding destination of the packet received by any one of the plurality of network interface units, and forwarding the packet to any one of the plurality of network interface units; and
    a power state control unit for controlling a power state of at least one of the plurality of network interface units and the packet forwarding unit,
    wherein the at least one of the plurality of network interface units and the packet forwarding unit is a power state control subject which is controllable to be brought into a plurality of power states different in power consumption, whose forwarding performance increases as the power consumption increases and decreases as the power consumption decreases,
    wherein the power state control unit transmits, in order to change the power state of the second network switching device, a forwarding performance notification including the forwarding performance of a power state control subject after the change to the second network switching device,
    wherein the first network switching device is configured to be redundant with the second network switching device,
    wherein the first network switching device further comprises:
        a redundancy management table for managing a relationship in the redundancy; and
        a protocol control unit for managing a redundancy protocol used for configuring the network to be redundant,
    wherein the protocol control unit refers to the redundancy management table, and determines whether to operate the first network switching device as a device actually to forward the packet, or as a device not to forward the packet, and
    wherein the power state control unit transmits, in a case where the first network switching device is determined to operate as the device actually to forward the packet, and the power state of at least one of the power state control subjects is changed, in order to change the power state of the second network switching device operating as the device not to forward the packet, the forwarding performance notification including the forwarding performance of the power state control subject after the change to the second network switching device, and changes, in a case where the first network switching device is determined to operate as the device not to forward the packet, and receives the forwarding performance notification from the second network switching device operating as the device actually to forward the packet, the power state of the power state control subject so as to satisfy the forwarding performance included in the received forwarding performance notification.

2. The first network switching device according to claim 1, wherein
    the power state control unit transmits, in a case where the first network switching device is determined to operate as the device actually to forward the packet, and the power state of at least one of the power state control subjects is changed, in order to change the power state of the second network switching device operating as the device not to forward the packet, the forwarding performance notification including the forwarding performance of the power state control subject after the change to the second network switching device operating as the device not to forward the packet,
    wherein the redundancy protocol is a VRRP,
    wherein the first network switching device and the second network switching device each have a virtual network switching device set thereon for each interface having an IP address assigned thereto,
    wherein the network is configured to be redundant between the virtual network switching device set on the first network switching device and the virtual network switching device set on the second network switching device,
    wherein the redundancy management table includes a priority set to the virtual network switching device configuring the network to be redundant, and
    wherein the protocol control unit is configured to:
        determine, based on the priority in the redundancy management table, whether to operate the first network switching device as the device actually to forward the packet, or as the device not to forward the packet;
        set, in a case where the first network switching device is determined to operate as the device actually to forward the packet, the virtual network switching device on the first network switching device so that the virtual network switching device actually forwards the packet; and
        set, in a case where the first network switching device is determined to operate as the device not to forward the packet, the virtual network switching device on the first network switching device so that the virtual network switching device is not forward the packet.

3. The first network switching device according to claim 1, wherein the power state control unit calculates, in a case where the power state of at least one of the power state control subjects on the first network switching device is changed, based on the power state of the power state control subject after the change, a sum value of the forwarding performances of the power state control subjects after the change, and transmits the forwarding performance notification including the calculated sum value and an assignment method for assigning the forwarding performance on the second network switching device to the second network switching device, wherein the assignment methods include a first method of uniformly assigning the forwarding performance to the power state control subjects, and a second method of preferentially assigning the forwarding performance starting from a specific power state control subject, wherein the assignment method included in the forwarding performance notification is one of the first method and the second method, and the power state control unit is configured to:
  determine, in a case where the first network switching device receives the forwarding performance notification including the sum value and the assignment method from the second network switching device, whether the assignment method included in the forwarding performance notification is the first method or the second method;
  change, in a case where the assignment method included in the forwarding performance notification is determined to be the first method, the power states of the power state control subjects so that the sum value of the forwarding performances included in the forwarding performance notification is to be uniformly distributed to the power state control subjects; and
  change, in a case where the assignment method included in the forwarding performance notification is determined to be the second method, the power states of the power state control subjects so that the sum value of the forwarding performances included in the forwarding performance notification is to be distributed preferentially starting from a specific power state control subject.

4. The first network switching device according to claim 1, wherein the power state control unit transmits, in a case where the first network switching device is determined to operate as the device actually to forward the packet, and the power state of at least one of the power state control subjects is changed, in order to change the power state of the second network switching device operating as the device not to forward the packet, the forwarding performance notification including the forwarding performance of the power state control subject after the change to the second network switching device operating as the device not to forward the packet, wherein the first network switching device configures the network to be redundant between the first network switching device and at least two second network switching devices, wherein the redundancy protocol is a VRRP, wherein the first network switching device and the second network switching device each have a virtual network switching device set thereon for each interface having an IP address assigned thereto, wherein the network is configured to be redundant between the virtual network switching device set on the first network switching device and the virtual network switching device set on the second network switching device, wherein the redundancy management table includes a priority set to the virtual network switching device configuring the network to be redundant, wherein the protocol control unit is configured to:
  refer to the redundancy management table, thereby calculating a sum value of priorities of the virtual network switching devices of each of the network switching devices;
  determine, in a case where the sum value of the priorities on the network switching device including the protocol control unit is a maximum, to operate the network switching device as the device actually to forward the packet;
  determine, in a case where the sum value of the priorities on the network switching device including the protocol control unit is a second maximum, to operate the network switching device as the device not to forward the packet; and
  determine, in a case where the sum value of the priorities on the network switching device including the protocol control unit is at most a third maximum, to operate the network switching device as an auxiliary device not to forward the packet, and wherein the power state control unit sets, in a case where the first network switching device is determined to operate as the auxiliary device not to forward the packet, the power state of the power state control subject of the first network switching device to a power state lowest in power consumption.

5. The first network switching device according to claim 4, wherein one of the at least two second network switching devices operates as the device actually forward the packet, one of the at least two second network switching devices operates as the device not to forward the packet, and the first network switching device operates as the auxiliary device not to forward the packet, and wherein in a case where the power state control unit of the first network switching device operating as the auxiliary device not to forward the packet receives, from the second network switching device operating as the device actually to forward the packet, a failure occurrence notification indicating detection of occurrence of a failure on the second network switching device operating as the device actually to forward the packet, and including a current forwarding performance of the second network switching device, the power state control unit of the first network switching device operating as the auxiliary device not to forward the packet changes the power state of the power state control subject so as to satisfy the forwarding performance included in the received failure occurrence notification, thereby operating the first network switching device as the device not to forward the packet.

6. The first network switching device according to claim 1, wherein in a case where the power state control unit receives the forwarding performance notification from the second network switching device, the power state control unit changes the power state of the power state control subject so as to satisfy the forwarding performance included in the received forwarding performance notification.

7. The first network switching device according to claim 1, wherein
the power state control unit transmits, in a case where the first network switching device is determined to operate as the device actually to forward the packet, and the power state of at least one of the power state control subjects is changed, in order to change the power state of the second network switching device operating as the device not to forward the packet, the forwarding performance notification including the forwarding performance of the power state control subject after the change to the second network switching device operating as the device actually to forward the packet,
wherein the redundancy protocol is a VRRP, and
wherein the power state control unit transmits, in a case where the first network switching device is determined to operate as the device actually to forward the packet, and the power state of the at least one of the power state control subjects is changed, the forwarding performance notification to the second network switching device by using a format of a VRRP packet to be transmitted by the first network switching device operating as the device actually to forward the packet to the second network switching device operating as the device not to forward the packet at each predetermined time interval.

8. A network switching system, comprising:
a plurality of network switching devices coupled to a network and different in at least one of a device configuration and a device performance,
wherein at least one of a first network switching device and a second network switching device included in the plurality of network switching devices carries out network switching for a packet,
wherein each of the plurality of network switching devices has:
   a plurality of network interface units for transmitting and receiving a packet to and from the network; and
   a power state control unit for controlling a power state of at least one of the plurality of network interface units and the packet forwarding unit,
wherein each of the plurality of network switching devices determines a forwarding destination of the packet received by any one of the plurality of network interface units,
wherein the at least one of the plurality of network interface units and the packet forwarding unit is a power state control subject which is controllable to be brought into a plurality of power states different in power consumption, whose forwarding performance increases as the power consumption increases and decreases as the power consumption decreases,
wherein the power state control unit of the first network switching device transmits, in a case where the power state of at least one of the power state control subjects is changed, in order to change the power state of the power state control subject of the second network switching device, the forwarding performance notification including the forwarding performance of the power state control subject after the change to the second network switching device,
wherein in a case where the power state control unit of the second network switching device receives the forwarding performance notification, the power state control unit changes the power state of the power state control subject so as to satisfy the forwarding performance included in the received forwarding performance notification,
wherein the first network switching device is configured to be redundant with the second network switching device,
wherein each of the plurality of network switching devices further has:
   a packet forwarding unit for forwarding the packet to any one of the plurality of network interface units;
   a redundancy management table for managing a relationship in the redundancy; and
   a protocol control unit for managing a redundancy protocol used for configuring the network to be redundant,
wherein the protocol control unit refers to the redundancy management table, and determines whether to operate the first network switching device as a device actually to forward the packet, or a device not to forward the packet,
wherein the redundancy protocol is a VRRP,
wherein the first network switching device has a virtual network switching device set thereon for each interface having an IP address assigned thereto,
wherein the network is configured to be redundant between the virtual network switching device set on the first network switching device and the virtual network switching device set on the second network switching device, and the redundancy management table includes a priority set to the virtual network switching device configuring the network to be redundant, and
wherein the protocol control unit is configured to:
   determine, based on the priority in the redundancy management table, whether to operate the first network switching device as the device actually to forward the packet or to operate as the device not to forward the packet;
   set, in a case where the first network switching device is determined to operate as the device actually to forward the packet, the virtual network switching device on the first network switching device so that the virtual network switching device actually forwards the packet, and
   set, in a case where the first network switching device is determined to operate as the device not to forward the packet, the virtual network switching device on the first network switching device so that the virtual network switching device is not forward the packet.

9. The network switching system according to claim 8, wherein,
the power state control unit of the first network switching device calculates, in a case where the power state of at least one of the power state control subjects is changed, based on the power state of the power state control subject after the change, a sum value of the forwarding performances of the power state control subjects after the change, and transmits the forwarding performance notification including the calculated sum value and an assignment method for assigning the forwarding performance on the first network switching device to the second network switching device,
wherein the assignment methods include a first method of uniformly assigning the forwarding performance to the power state control subjects, and a second method of preferentially assigning the forwarding performance starting from a specific power state control subject,
wherein the assignment method included in the forwarding performance notification is one of the first method and the second method, and wherein the power state control unit of the second network switching device is configured to:
- determine, in a case where the second network switching device receives the forwarding performance notification including the sum value and the assignment method from the first network switching device, whether the assignment method included in the forwarding performance notification is the first method or the second method;
- change, in a case where the assignment method included in the forwarding performance notification is determined to be the first method, the power states of the power state control subjects so that the sum value of the forwarding performances included in the forwarding performance notification is to be uniformly distributed to the power state control subjects; and
- change, in a case where the assignment method included in the forwarding performance notification is determined to be the second method, the power states of the power state control subjects so that the sum value of the transfer performances included in the forwarding performance notification is to be distributed preferentially starting from a specific power state control subject.

10. The network switching system according to claim 8, wherein the network switching system comprises at least three network switching devices for configuring the network to be redundant, wherein the redundancy protocol is a VRRP, wherein the first network switching device and the second network switching device each have a virtual network switching device set thereon for each interface having an IP address assigned thereto, wherein the network is configured to be redundant between the virtual network switching device set on the first network switching device and the virtual network switching device set on the second network switching device, wherein the redundancy management table includes a priority set to the virtual network switching device configuring the network to be redundant, wherein the protocol control unit is configured to:
- refer to the redundancy management table, thereby calculating a sum value of priorities of the virtual network switching devices of each of the plurality of network switching devices;
- determine, in a case where the sum value of the priorities on the network switching device including the protocol control unit is a maximum, to operate the network switching device as the device actually to forward the packet;
- determine, in a case where the sum value of the priorities on the network switching device including the protocol control unit is a second maximum, to operate the network switching device as the device not to forward the packet; and
- determine, in a case where the sum value of the priorities on the network switching devices including the protocol control unit is at most a third maximum, to operate the network switching device as an auxiliary device not to forward the packet, and wherein the power state control unit sets, in a case where the network switching device is determined to operate as the auxiliary device not to forward the packet, the power state of the power state control subject of the network switching device to a power state lowest in power consumption.

11. The network switching system according to claim 10, wherein in a case where the network switching device operating as the device not to forward the packet detects occurrence of a failure on the network switching device operating as the device actually to forward the packet, the network switching device operating as the device not to forward the packet transmits a failure occurrence notification indicating the detection of the occurrence of the failure on the network switching device operating as the device actually to forward the packet, and including a current forwarding performance of the power state control subject of the network switching device operating as the device not to forward the packet to the network switching device operating as the auxiliary device not to forward the packet, and operates as the device actually to forward the packet, and wherein in a case where the power state control unit of the network switching device operating as the auxiliary device not to forward the packet receives the failure occurrence notification, the power state control unit changes the power state of the power state control subject so as to satisfy the forwarding performance of the power state control subject included in the received failure occurrence notification, and operates as the device not to forward the packet.

12. The network switching system according to claim 8, wherein the power state control unit of the second network switching device is configured to:
- set the power state of the power state control subject to a power state lowest in power consumption; and
- change, in a case where receiving the forwarding performance notification from the first network switching device, the power state of the power state control subject so as to satisfy the forwarding performance included in the received forwarding performance notification.

13. A method of changing a power state of a network switching device in a network switching system in which network switching processing is carried out on at least one of a plurality of network switching devices coupled to a network, and different in at least one of a device configuration and a device performance, each of the plurality of network switching devices having:
- a plurality of network interface units for transmitting and receiving a packet to and from the network; and
- a packet forwarding unit for determining a forwarding destination based on the packet received by any one of the plurality of network interface units, and forwarding the packet to any one of the plurality of network interface units;

at least one of the plurality of network interface units and the packet forwarding unit being a power state control subject which is controllable to be brought into a plurality of power states different in power consumption, whose forwarding performance increases as the power consumption increases and decreases as the power consumption decreases, the method comprising:
- referring to the redundancy management table, and determining whether to operate the network switching device as a device actually to forward the packet, or a device not to forward the packet; and
- transmitting, in a case where the network switching device is determined to operate as the device actually to forward the packet, and the power state of at least one of the power state control subjects is changed, in order to change the power state of the network switching device operating as the device not to forward the packet, a forwarding performance notification including the forwarding performance of the power state control subject after the change to the network switching device operating as the device not to forward the packet.

* * * * *